United States Patent [19]

Meynard et al.

[11] Patent Number: 5,737,201
[45] Date of Patent: Apr. 7, 1998

[54] ELECTRONIC DEVICE FOR ELECTRICAL ENERGY CONVERSION BETWEEN A VOLTAGE SOURCE AND A CURRENT SOURCE BY MEANS OF CONTROLLABLE SWITCHING CELLS

[76] Inventors: Thierry Meynard, 57, rue Labat de Savignac, 31400 Toulouse; Henri Foch, 78, avenue Maignan, 31200 Toulouse, both of France

[21] Appl. No.: 30,165

[22] PCT Filed: Jul. 8, 1992

[86] PCT No.: PCT/FR92/00652

§ 371 Date: Mar. 24, 1993

§ 102(e) Date: Mar. 24, 1993

[87] PCT Pub. No.: WO93/02501

PCT Pub. Date: Feb. 4, 1993

[30] Foreign Application Priority Data

Jul. 25, 1991 [FR] France ................... 91 09582

[51] Int. Cl.[6] ............................................. H02M 3/18
[52] U.S. Cl. ...................................... 363/60; 307/110
[58] Field of Search ............................. 307/110; 320/1; 363/59, 60

[56] References Cited

U.S. PATENT DOCUMENTS 3,596,369   8/1971   Dickerson et al. .......... 321/43
5,159,543   10/1992  Yamawaki ................... 363/60
5,179,289   1/1993   Sridharan .................. 307/110

FOREIGN PATENT DOCUMENTS 2435392   5/1974   Germany.

OTHER PUBLICATIONS

IEEE Trans. On Aerospace and Electronic Systems, vol. 24, No. 6, Nov. 1988, New York, pp. 743–754; Tymerski 'Generation and Classification of PWM DC–to–DC Converter' p. 750, config N2.

International Journal of Electronics; vol. 68, No. 1, Jan. 1990, London, pp. 143–160; Nakaoka "New efficient high-frequency power inverter . . ." pp. 146–151, figs 1, 3, 11.

Primary Examiner—Peter S. Wong
Assistant Examiner—Y. J. Han
Attorney, Agent, or Firm—Harold H. Dutton, Jr.; W. Charles L. Jamison; Diane F. Liebman

[57] ABSTRACT

This invention relates to an electronic device for the conversion of electric energy between a voltage source E and a current source J. This device is comprised of cascaded switching cells ($CL_k$) each having two switches ($I_{Ak}$, $I_{Bk}$) and comprising capacitors ($C_k$) associated with the cells for distributing the voltage of the source over the switches, and control logics ($LG_k$) which condition the exchanges of energy and are synchronized for limiting the voltage supported by each switch to a fraction (V/n) of the supply voltage, for limiting the ripple amplitude of the voltage of the output to the same fraction V/n and for conferring on this ripple voltage a frequency (nF) which is a multiple of the switching frequency (F) of the switches.

20 Claims, 27 Drawing Sheets

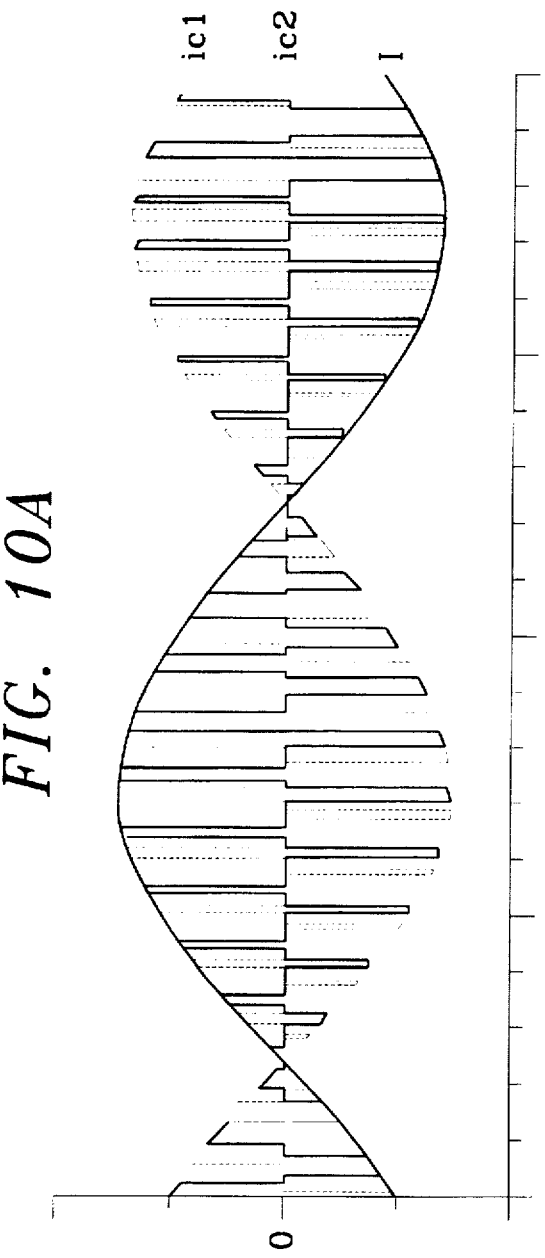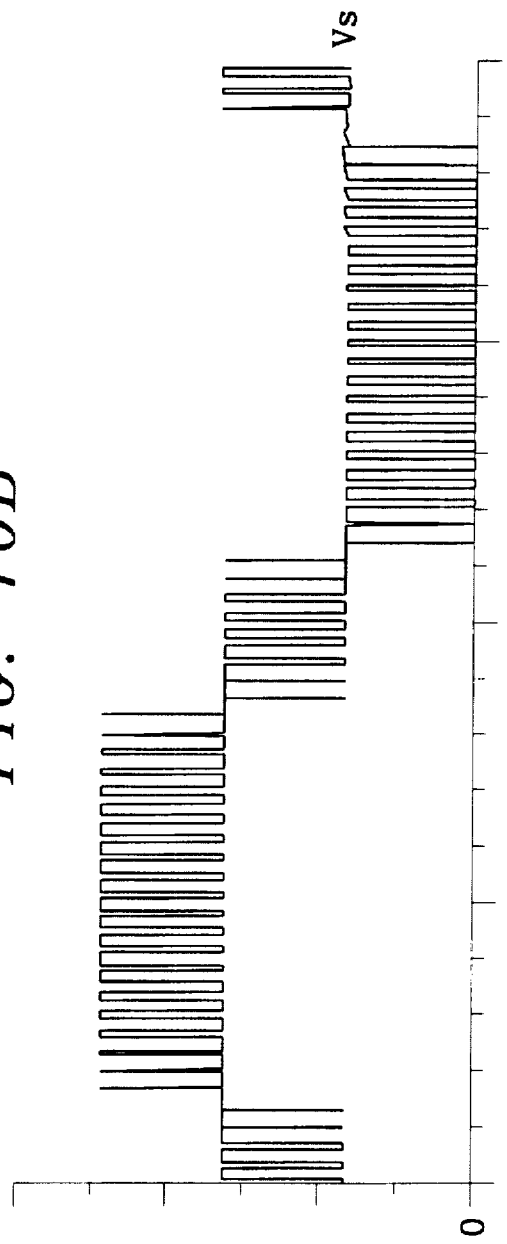

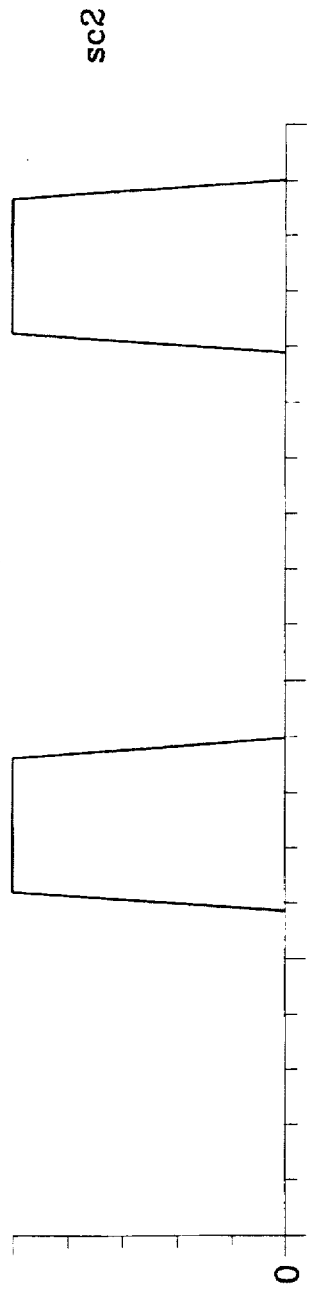
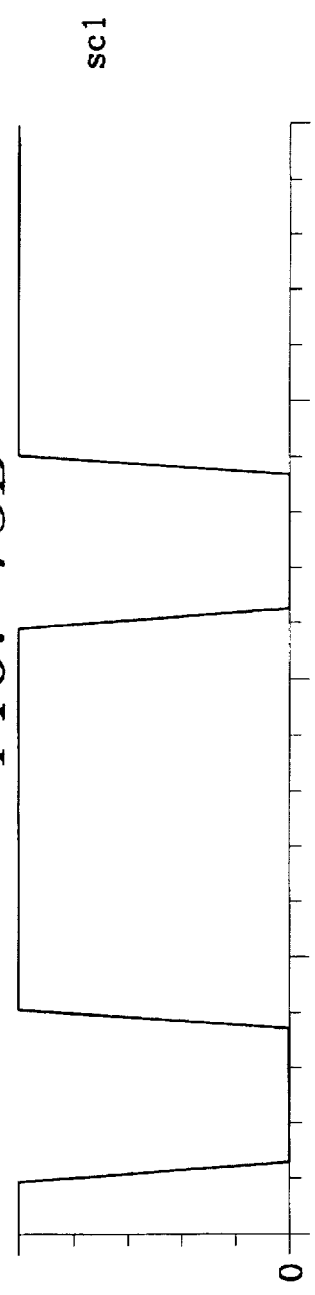
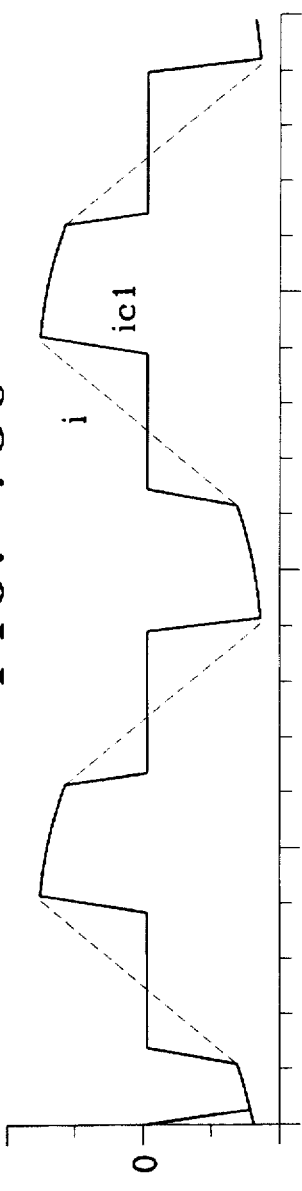
FIG. 13A
FIG. 13B
FIG. 13C

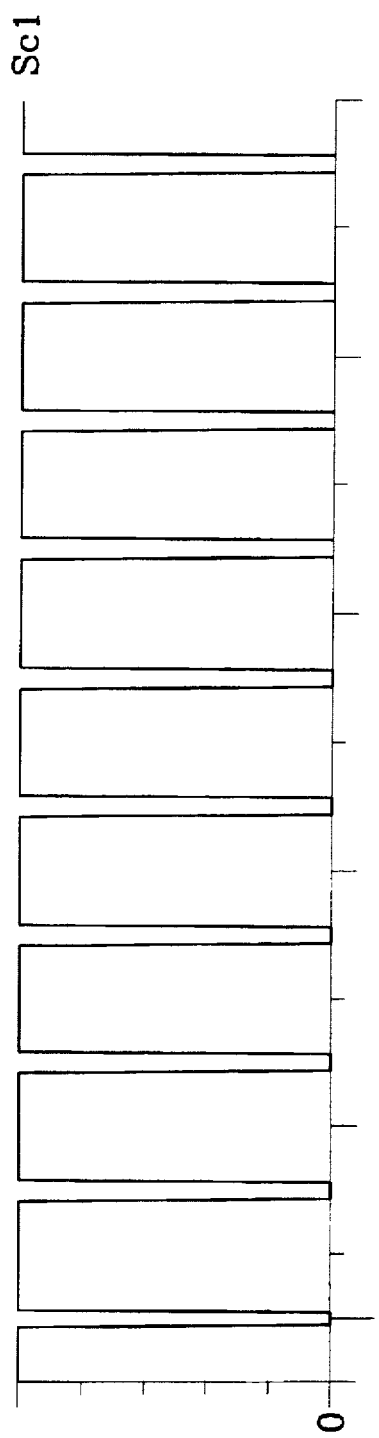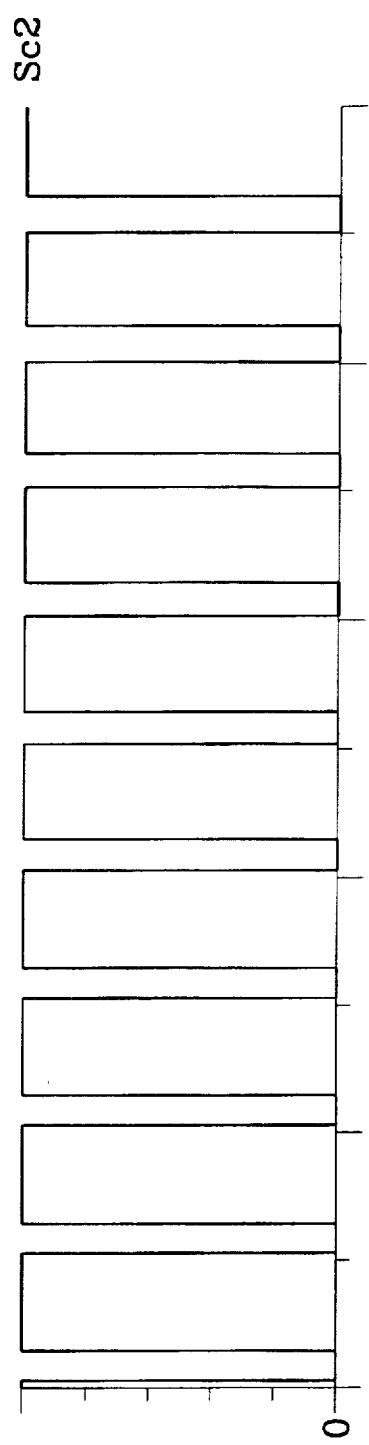

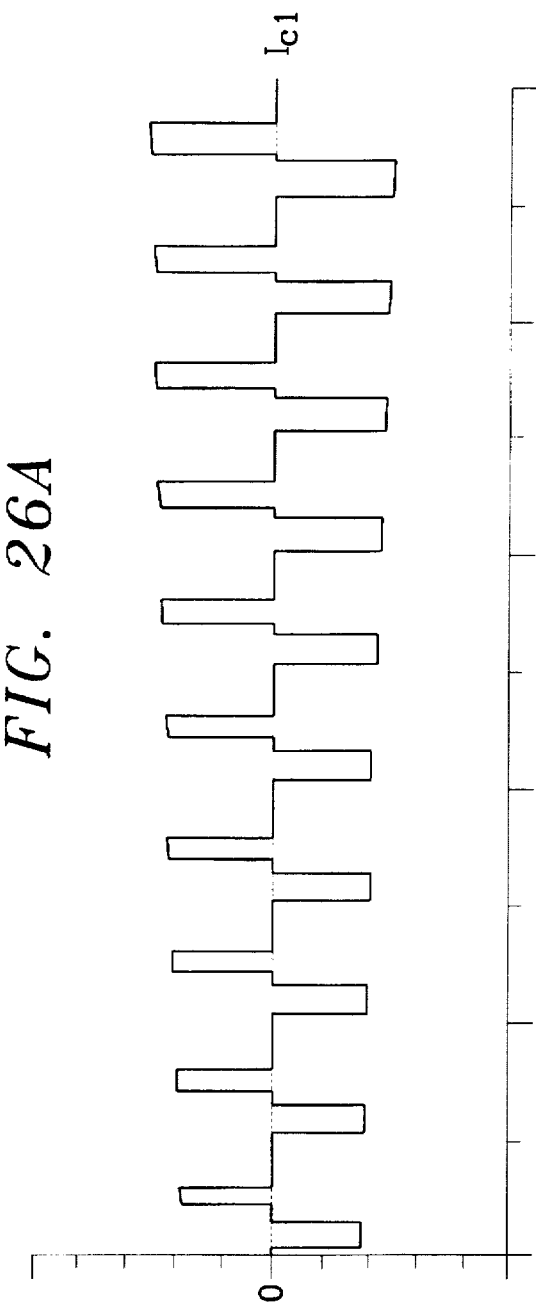
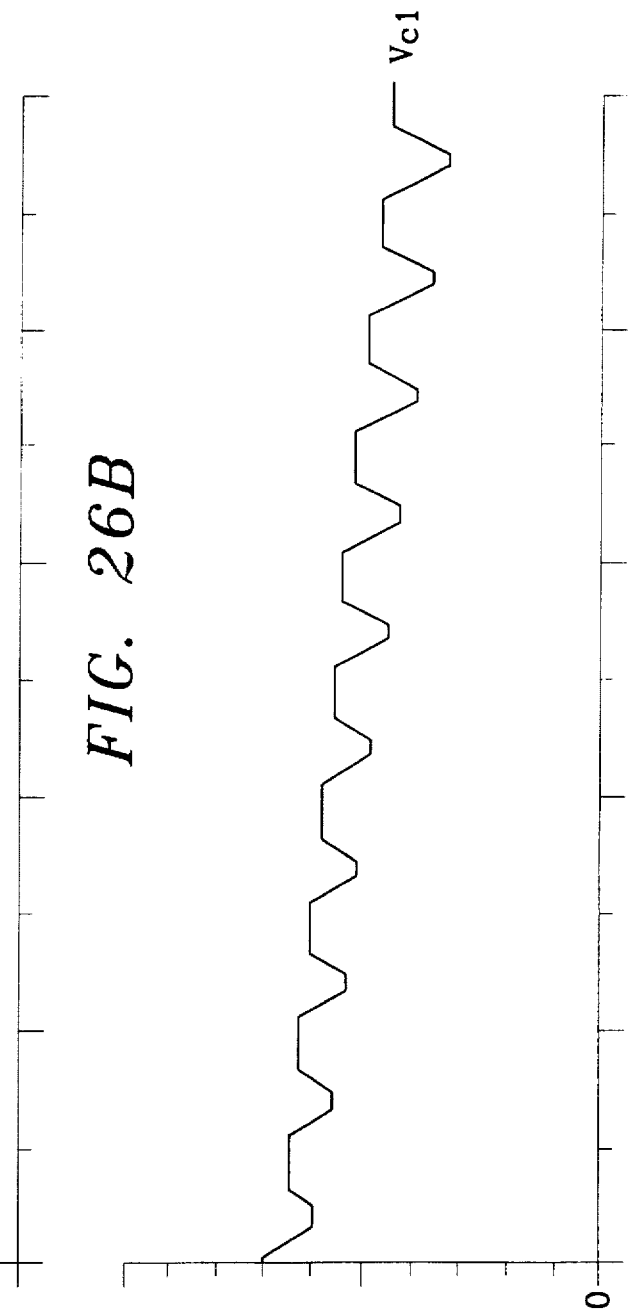

ELECTRONIC DEVICE FOR ELECTRICAL ENERGY CONVERSION BETWEEN A VOLTAGE SOURCE AND A CURRENT SOURCE BY MEANS OF CONTROLLABLE SWITCHING CELLS

This invention relates to an electronic device for converting electric energy between a voltage source and a current source, comprising n controllable switching cells, each comprised of at least two switches working in a complementary manner, with $n \geq 2$.

BACKGROUND AND OBJECTS OF THE INVENTION

According to the definition provided in "Techniques de l'Ingenieur," Electronic Volume, pp D3-150 and following; by the term "voltage source" is meant an electric dipole (generator or receiver) of which the voltage at the terminals can not undergo a discontinuity by reason of the circuit exterior to said dipole (examples: storage battery, alternating distribution networks, high value capacitor . . . ); by the term "current source" is meant an electric dipole (receiver or generator) which is traversed by a current which cannot undergo a discontinuity by reason of the circuit external to said dipole (examples: inductive load, coil, direct current machine . . . ).

In a conventional manner, static converting devices are comprised of a combination of switching cells, each formed from two switches of complementary operation, that is, one being conducting when the other is blocked or non-conducting. Each cell has an associated control logic which assures the complementary status and manages the exchanges of energy as a function of the application.

A variation of these prior converting devices, known as a "three level converter" is known and has been in use since 1981 in the high voltage field (references: Ch. Bachle et al, "Requirements on the Control of a Three-Level Four Quadrant Power Converter in a Traction Application," Proceeding E.P.E. Aachen 1989, pp 577 to 582; B. Velaerts et al, "New Developments of 3-Level PWM Strategies," Proceeding E.P.E. Aachen 1989, pp 411 to 416.) Devices of this type are comprised of modules with four switches and these latter are imbricated to form two series, and no longer operate in a complementary manner. Two diodes are connected to a capacitative mid-point connected to the voltage source in order to limit the value of the voltages supported by each of the 4 switches to the half-voltage and to furnish three levels of voltage output, (from which comes the name "three level invertor" for these devices). A specific control is necessary in this type of device to permit the set of diodes to carry out its role of clipping and dividing the voltage, but this control is incompatible with a complementary operation of the switches of the two series. Under these conditions; such a device provides at the output a voltage wave in which the amplitude and the frequency are related:

this wave is accomplished either between the level of intermediate voltage and one of the extreme levels and thus has an amplitude which is only a fraction (V/2) of the overall supply voltage (V), the frequency of this wave being then equal to the control frequency (F) of the switches, or this wave overlays the three voltage levels and thus has an amplitude equal to the overall supply voltage (V), but in this case, the frequency of this wave is a multiple of the control frequency of each switch (2F).

In the first case, the limited value (V/2) of the wave amplitude of the output voltage would tend to facilitate its filtering, but this would eliminate a low frequency F, which limits this advantage. Conversely, in the second case, the high frequency (2F) of the output voltage wave would tend to facilitate its filtering, but the high value of the amplitude thereof (V) limits this advantage. As a result, by their own nature, these devices do not permit benefitting from the advantages associated with a reduction of amplitude (V/2) and a multiplication of frequency (2F).

In other words, the very specific character of the control of these devices, the switches of which do not operate in a complementary manner, limits to four the number of switches which can make up a module.

It is to be noted that certain conventional converters (converters with greater pulse modulation) are comprised of combinations of switching cells which are arranged in parallel on the voltage source, with the current source connected between the switching cells. In these converters, the switches of each cell operate in a complementary mode (Patel and Hoft, "Generalized Techniques of Harmonic Elimination and Voltage Control in Thyristor Inverters," I.E.E.E. Transactions On Industry Applications, Vol. IA.9, n. 3, May-June 73). These devices may have the cumulative advantages indicated previously (conversion with reduced voltage and multiple frequency). However, in these converters: each switch must support the total overall supply voltage which, for high voltages, is a serious drawback with respect to prior devices in which the voltage at the terminals of each switch is a fraction (V/2) of the overall voltage (V). Moreover, the number of levels of voltage delivered at the output of these inverters is limited to three, and the multiplication of the frequency is limited to 2, regardless of the number of parallel cells.

DESCRIPTION OF THE INVENTION

The present invention seeks to provide an improved conversion apparatus, which combines the following advantages:

the possibility of placing in operation a high number of cells (n), this number may be equal to 2, but may also have a greater value (3 or more);

voltage carried by each switch equal to a fraction (V/n) of the overall supply voltage (V);

conversion of the output voltage with an amplitude limited to the fraction (V/n) of the total voltage, frequency of this inversion which is a multiple of the switching frequency of each switch (F).

To this end, the device provided by the invention for the conversion of electrical energy between a voltage source and a current source comprises the following means:

-n- controllable stitching cells, each comprising two switches, with $n \geq 2$, each cell being marked by a rank k with $1 \leq k \leq n$, a control logic connected to each switching cell for delivering to it control signals of a frequency F able to assure opposite switchings for the two switches of the cell, control means adapted to deliver to the control logic a reference signal sr as a function of the desired energy conversion, n homologous switching cells connected in series and n other homologous switches being themselves connected in series, in such a manner as to provide two symmetrical series, termed series A and series B, in which the two switches of each cell occupy symmetrical positions with respect to the current source, the two series A and B of switches being interconnected, first, by a side common to the current source, and second, by their opposite sides common to the voltage source, the rank k associated with the cells increasing from the cell whose switches are directly connected or common to the current source (k=1) up to the cell whose switches are directly connected or common to the voltage source (k=n).

The device according to the present invention is characterized in that:

capacitors are associated with the switching cells in such a manner that the symmetrical terminals of the two switches of each cell are connected together through a capacitor for maintaining a voltage, called a capacitor charge voltage, between the terminals, and assuring an alternating circulation of current from one switch to the other switch of the cell.

the control logics of the n switching cells are synchronized for distributing their control signals over time in such a manner that the circulating current in each capacitor presents, in one period 1/F, an average value essentially proportional to the variation of the voltage at the terminals of the source voltage over this same period, and in particular essentially zero for a continuous voltage source.

As will be better understood below, the capacitors provided on the terminals of each cell support increasing fractions of the voltage from the source as a function of their rank. The difference between the charge voltages of these successive capacitors is thus equal to V/n, and it is this difference (V/n) which supports the two switches of the cell connected to the two capacitors considered. Moreover, the synchronization of the control logics permits obtaining a frequency (nF) of the output voltage wave which is a multiple of the control frequency (F) by reason of the shifts of the switchings of the n cells which are distributed over each period 1/F. In other words, this shift brings about the appearance of n distinct levels of output voltage (n levels distributed regularly over the period 1/F, two adjacent levels being separated by a voltage equal to V/n).

The operation of each cell is similar to that of the adjacent cell (at the nearby time shift) such that it is possible to readily understand in each application the control logics permitting management of the desired energy exchanges regardless of the number n of cells placed in the set (these control logics all being structurally analogous since the control signals which they deliver have the same motives and are deduced one from the other by a shift).

DESCRIPTION OF THE DRAWINGS

The description which follows in reference to the accompanying drawings shows the invention; in these drawings which form an integral part of the present description:

FIG. 10 illustrates the tracing off the currents and voltages in the power portion of this device.

FIGS. 13 and 14 illustrate the tracing of the signals of the device of FIG. 12;

FIGS. 23, 24, 25, 26 and 27 illustrate the tracing of signals of the device of FIG. 22.

DETAILED DESCRIPTION OF PREFERRED EMBODIMENTS

Figure 1:
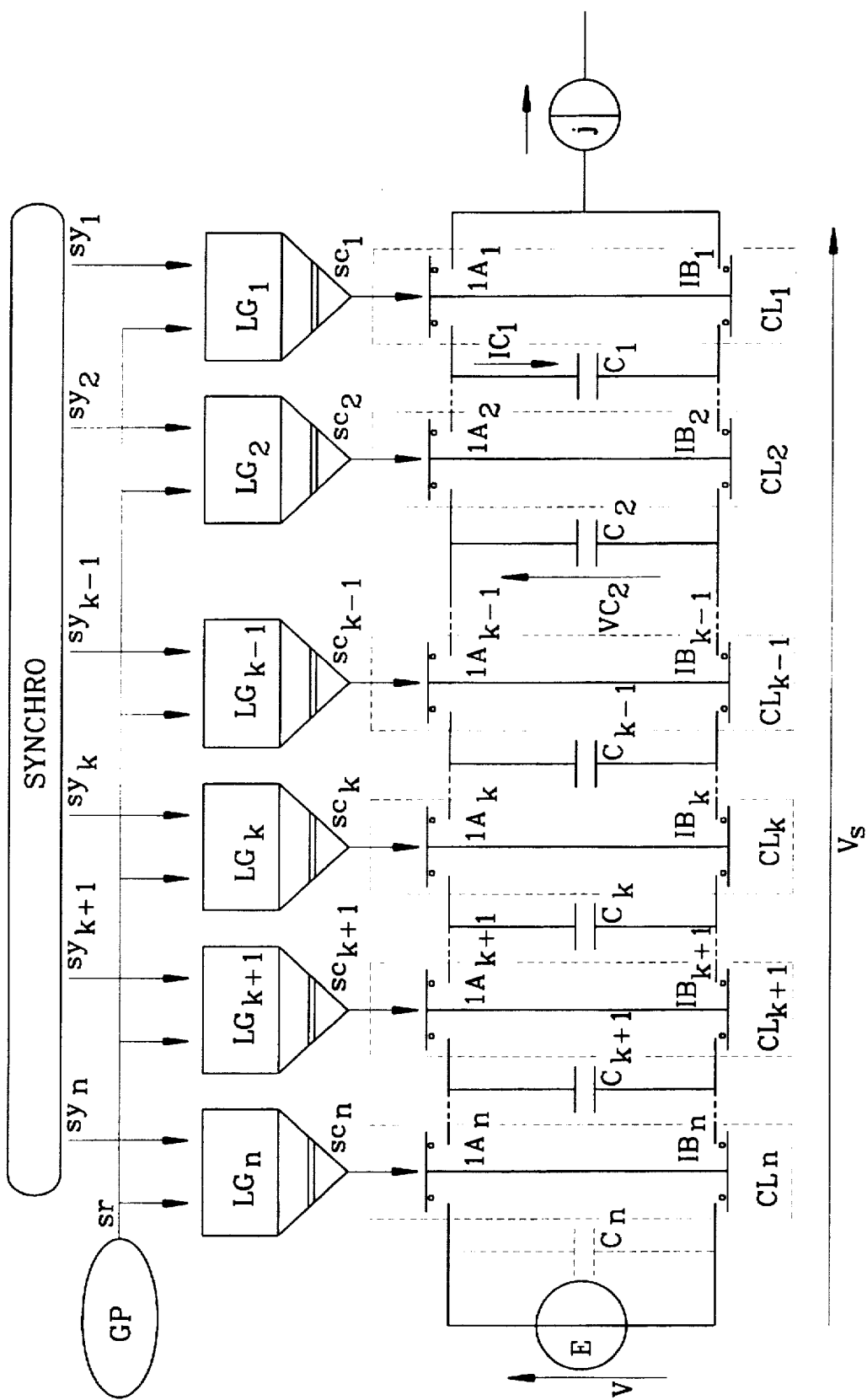
FIG. 1 is an electrical schematic view of the principle of the converting device of the invention, which shows its power portion and its control portion.

The device shown in FIG. 1 comprises n switching cells $CL_1$, $CL_2$ . . . $CL_k$ . . . $CL_n$, n being any whole number greater than or equal to two. Each cell is composed of two switches symbolized as $I_{Ak}$ and $I_{Sk}$ which are controlled to have complementary states at each instant; these switches are preferably static semiconductor switches.

A series of n switches of the n cells are connected and constitute the A series of the device; the n other switches are connected and form the B series. The two series A and B of switches are interconnected, first, by a common extremity to a source of current J (according to the definition provided above), and second by their opposite extremities to the terminals of a voltage source E (according to the definition provided above). The cell $CL_1$ is directly connected to the source of current J, the other cells being more remote from the source as their rank k increases, until reaching the cell of rank n directly connected to the terminals of the voltage source E.

The current source J and the voltage source E may have different characteristics depending upon the application (continuous, alternating, generating, receiving). The stitches are selected as a function of these characteristics in such a manner that their reversibility of voltage is identical to that of the voltage source E and their reversibility of current is identical to that of the current source J.

At each switching cell $CL_k$, there is associated a capacitor $C_k$ which is connected between the symmetrical terminals of the two switches $I_{Ak}$ and $I_{Bk}$ of the cell $CL_k$ under consideration, (the capacitor $C_k$ of rank k being connected between the common terminal of the switches $I_{Ak}$ and $I_{Ak+1}$ of one part, and the common terminal of the switches $I_{Bk}$ and $I_{Bk+1}$ of the other part). The last cell $CL_n$ may be associated with a specific capacitor $C_n$ (shown in broken lines in FIG. 1) in the hypotheses in which the source E will not be a perfect voltage source in order to compensate for its imperfections. In the contrary case, a perfect source E plays the role of capacitor $C_n$ with regard to the cell $CL_n$.

The blocked switch ($I_{Ak}$ in the example in the drawing) of the cell $CL_k$ supports the difference in voltages $V_{ck}-V_{ck-1}$ existing at the terminals of the two adjacent capacitors $C_k$ and $C_{k-1}$. Each capacitor has as its function to maintain at its terminals a voltage, called a load voltage $V_{ck}$ of the capacitor; a distribution of these load voltages proportional to the rank of the capacitor $V_{ck}=kV/n$ (V being the voltage at the terminals of the source E) assures at the terminals of the blocked switches a voltage difference $V_{ck}-V_{ck-1}$ equal to V/n for all the blocked switches. According to the states of the switches of the two cells ($CL_{k+1}$ and $CL_k$, the capacitor $C_k$ associated with the cell $CL_k$ is traversed by a current $i_{ck}$ equal to: +I, O or –I (I being the current which passes from the current source J). Each capacitor $C_k$ is sized such that the voltage variations $V_{ck}$ at its terminals are weak with respect to the voltage kV/n and in particular less than 0.2 V/n (the maximum voltage at the terminals of the blocked switches is then limited to 1.4 V/n).

In other words, each capacitor is selected to present a behavior under voltage as a function of its rank, greater than the value $k \cdot V_{max}/n$, where $V_{max}$ is the maximum value of the voltage V. It will be understood that the capacitors may be identical: they will then be sized to support the voltage $V_{max}$ (which is susceptible of being applied to the latter between them).

In addition, the device comprises n control logics $LG_1 \ldots LG_k, \ldots LG_n$, one logic being connected to each switching cell for delivering to it the logic control signals $sc_1, sc_2 \ldots sc_k \ldots sc_n$ of a frequency F able to assure the opposite switchings of the two switches of the cell at the frequency F.

Each logic, of a known structure, generally comprises a comparator and a matching circuit (a function of the type of switch which it controls), receives from the control means (shown in the drawings as a control generator GP) a reference signal sr either continuous (DC) or alternating (AC) which is a function of the energy conversion desired. This generator depends on the application and may, for example, furnish a reference signal commanding a regulation of current (current on output I of a given value regardless of the variations of the input voltage V).

The control logics $LG_k$ may be structurally identical and it is by their synchronization that the shifted switchings of the cells $CL_k$ are directed in order that:

the wave of the output voltage $V_s$ has an amplitude equal to V/n and a frequency equal to nF, a multiple of the switching frequency F of the switches $I_{Ak}$ and $I_{Bk}$.

the voltage supported by each capacitor $V_{ck}$ is equal to the fraction kV/n of the supply voltage V.

To this end, the control logics are connected to synchronization means SYNCHRO adapted to deliver to said logics synchronization signals $sy_1 \ldots sy_k \ldots sy_n$ able to impose the law of distribution in time of the control signals $sc_k$ issued by the logics $LG_k$. This distribution of control signals permits controlling the voltage $V_{ck}$ at the terminals of each capacitor such that the voltage is essentially proportional to its rank k (kV/n).

This result is obtained while controlling the current $i_{ck}$ circulating in each capacitor such that it has, on one period 1/Ft an average value essentially proportional to the variation of the voltage at the terminals of the voltage source E over this same period, and in particular essentially zero for a continuous voltage source. This control may in particular be achieved while delivering to the control logics $LG_k$ synchronization signals $sy_k$ which condition the output of said logic control signals $sc_k$ shifted with time, imposing logic states $e_k$ and $e_{k+1}$ of the adjacent cells of predetermined relative durations. The logic state $e_k$ of one cell $CL_k$ is defined as equal to 1 when the switch $I_{Ak}$ of the cell forming part of the series A is passing (the other switch $I_{Bk}$ of the cell, of the series B, being blocked), and equal to 0 when the switch of said A series is blocked (the other switch of the cell, of series B, being passing).

As will be seen from the examples which follow, the structure of the synchronization means depends upon the characteristics of the voltage source E and the current source J.

Figure 2:
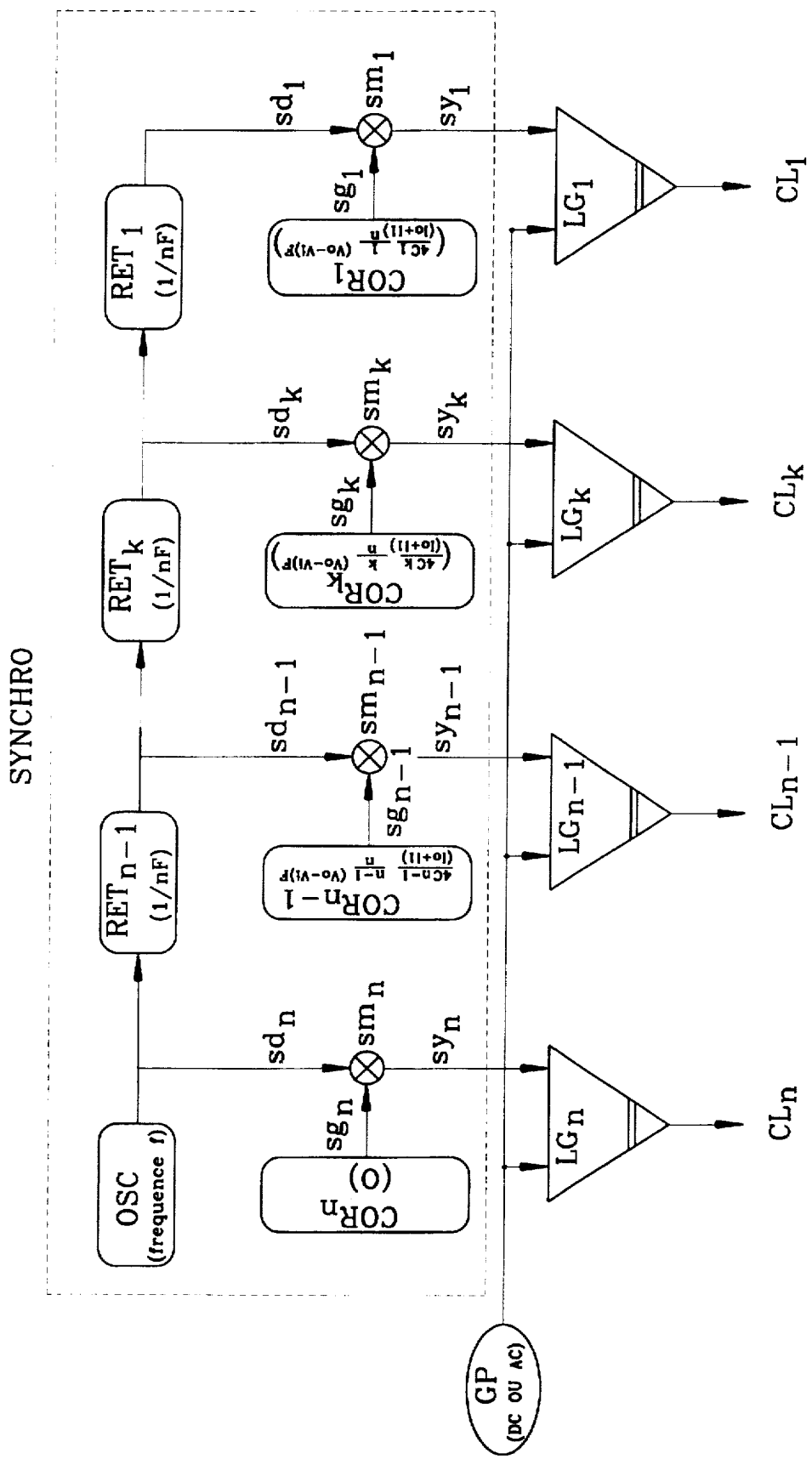
FIG. 2 shows one embodiment of the control portion of this device.

FIG. 2 explains one possible structure of the synchronization means SYNCHRO.

This synchronization means comprises in this example an oscillator OSC of a frequency F, and a succession of delay circuits $RET_k$, which generate a system of n signals $sd_k$ shifted for two successive signals of a time difference equal to 1/nF. These signals are corrected in n summers $SM_k$ which each receive a correction signal $sg_k$ and deliver at their output synchronization signals $sy_k$. The correction signals $sg_k$ are elaborated in correctors $COR_k$, as data, the values of the voltage V and the current I. The correction signal $sg_k$ delivered by each corrector $COR_k$ is proportional to the rank k of the corrector, at the frequency F, at the variation of voltage $V_0-V_1$ over the period 1/F, and at the capacitance of the capacitor of the same rank k, and inversely proportional to the average value $|I_0+I_1|/2$ of the current over said period:

$$sg_k \text{ proportional to } \frac{4C_k \times k \times (V_o - V_1) \times F}{(I_0 + I_1)n}$$

These values of the correction signals $sg_k$ assure the appropriate distribution of control signals $sc_k$ issued by the logics $LG_k$ and, as a consequence, the aforesaid distribution of voltages at the terminals of the capacitors and of the switches.

It should be noted that the correction which is produced in the foregoing example at the level of the synchronization means SYNCFRO may also (with an opposite sign) be on the reference signal sr issued by the control generator. The logics $LG_k$ being comprised of comparators (according to the adjustment circuits), the two circuits are functionally equivalent and the invention defined in the case of one or the other circuit extends as well to the two.

Figure 3A:
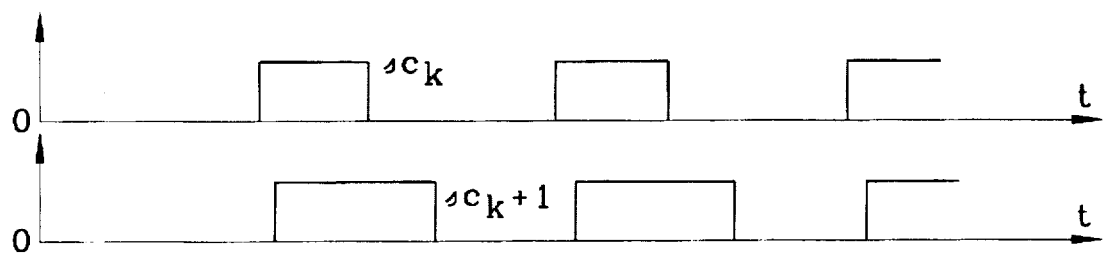
FIG. 3a illustrates the logic signals delivered to the two successive cells k and k+1.

FIG. 3a illustrates the tracing of the control signals $sc_k$ and $sc_{k+1}$ delivered by the control logics $LG_k$ and $LG_{k+1}$ to the two cells $CL_k$ and $CL_{k+1}$ (these signals represent the logic states $e_k$ and $e_{k+1}$ of these cells). These signals having a frequency F are shifted in time and have different periods (by reason of the corrective terms introduced).

Figure 3B:
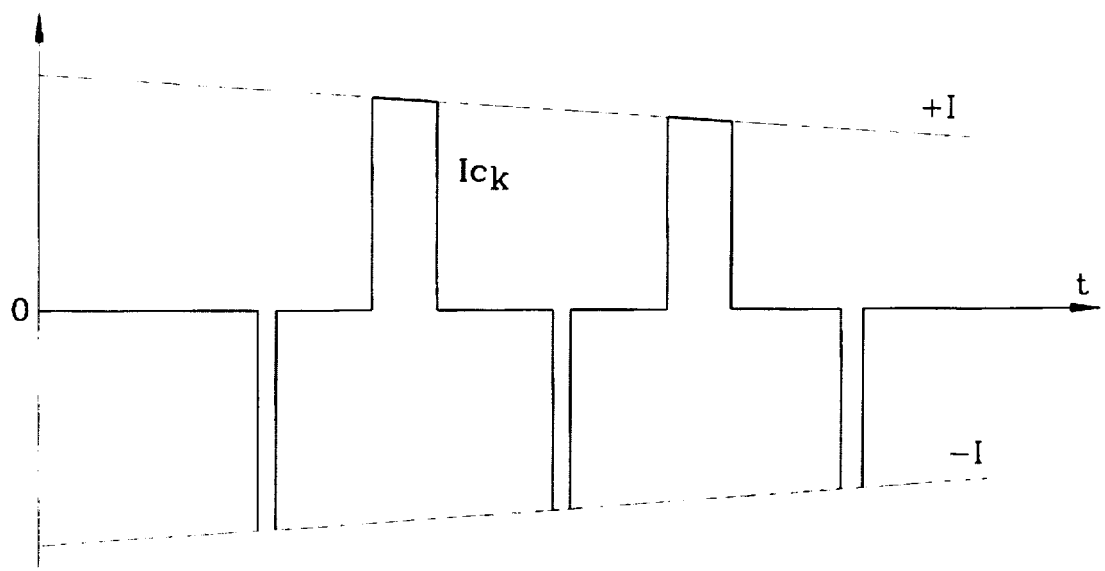
FIGS. 3b and 3c illustrate respectively the behavior of the current traversing the capacitor $C_k$ associated with the cell of rank k and the behavior of the voltage $V_{ck}$ at the terminals of this capacitor.
Figure 3C:
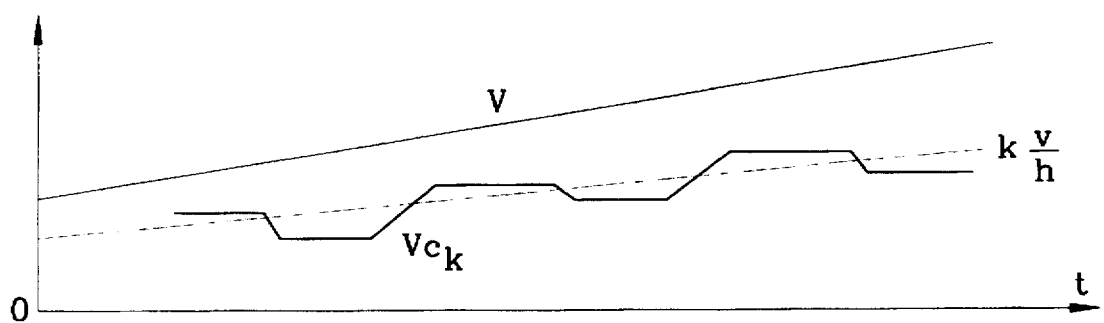

Schematically shown in FIG. 3b is the tracing of the current $I_{ck}$ in the capacitor $C_k$, which alternatively takes the values +I, O, –I, according to the relative positions of the fronts of the signals $sc_k$ and $sc_{k+1}$ (I: current which passes from the current source, here assumed variable). The circulation of the current $I_{ck}$ in the capacitor $C_k$ causes a variation of the voltage $V_{ck}$ at its terminals: the tracing thereof is illustrated in FIG. 3c. Over a period 1/F, the progression of the voltage $V_{ck}$ is proportional to the variation in the voltage V over the same period and to the rank k of the capacitor: $V_{ck}$ remains close at each instant to the value kV/n.

Figure 4:
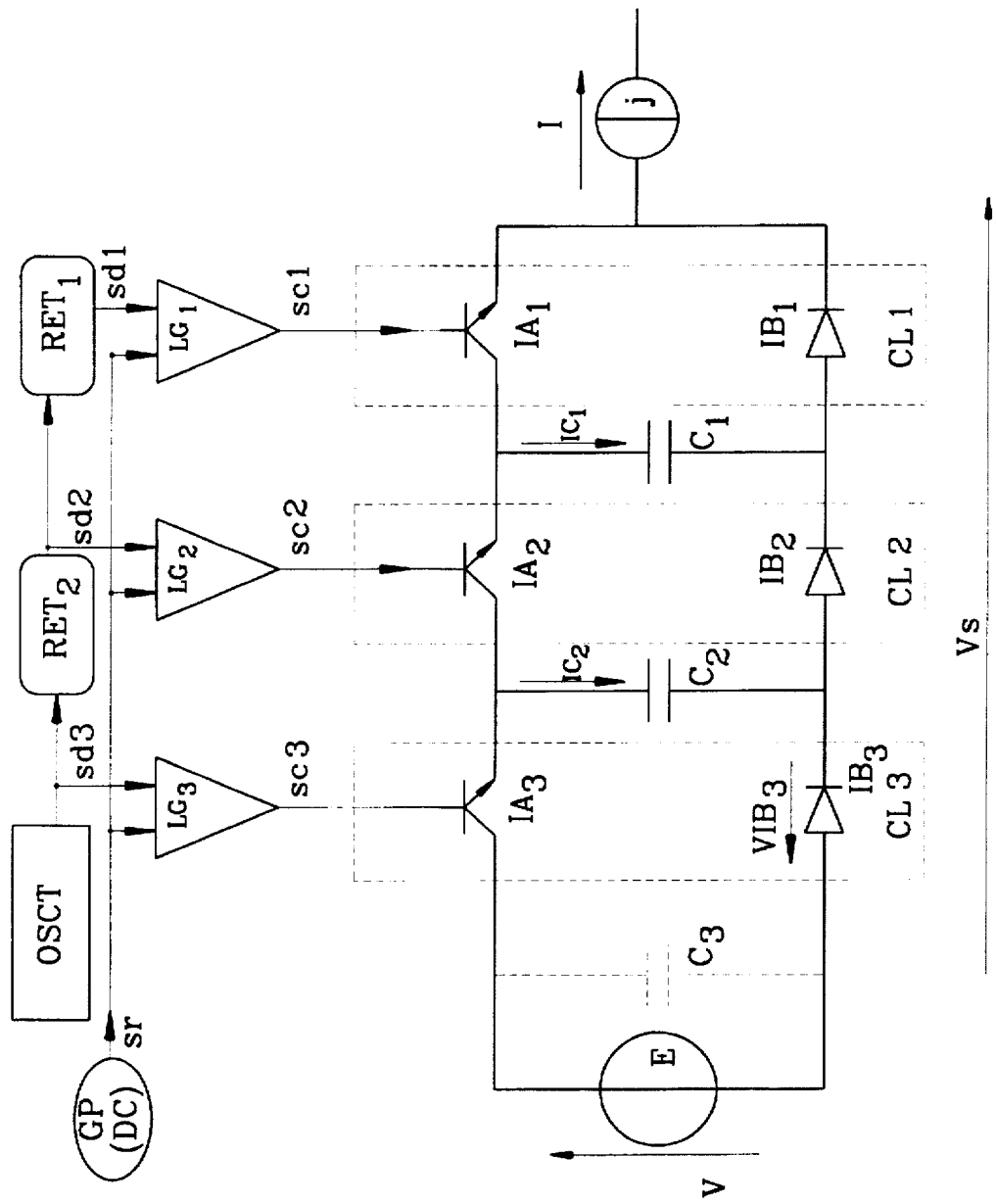
FIG. 4 is an electronic schematic of one embodiment of the device of the invention in the case of a continuous voltage source and a continuous current source (clipped direct current)

FIG. 4 is an example of the aforementioned embodiment in the case of a source E of continuous voltage and a source J of continuous current through all of the figures of the drawings, at the ends, in order to facilitate understanding thereof, the same references have been repeated for similar elements).

In this example which comprises three switching cells, the switches $I_{A1}$, $I_{A2}$, $I_{A3}$ of the A series are switches of the type which are controllable at the start and upon blocking, in particular bipolar transistor type (or even Darlington, MOST, GTO or IGBT transistors). The switches $I_{B1}$, $I_{B2}$, $I_{B3}$ of the B series are spontaneous double switching switches, i.e. diodes.

In this application, the synchronization means is adapted in such a manner that the control signals $sc_k$, $sc_{k+1}$ delivered to two cells of successive ranks k and k+1 impose on these cells logic states $e_k$ and $e_{k+1}$ such that, if $e_k \neq e_{k+1}$, the cumulative periods during which $e_k$ ET $\overline{e_{k+1}} = 1$ will be essentially equal to the cumulative periods during which $\overline{e_k}$ k ET $e_{k+1} = 1$.

Figure 5A:
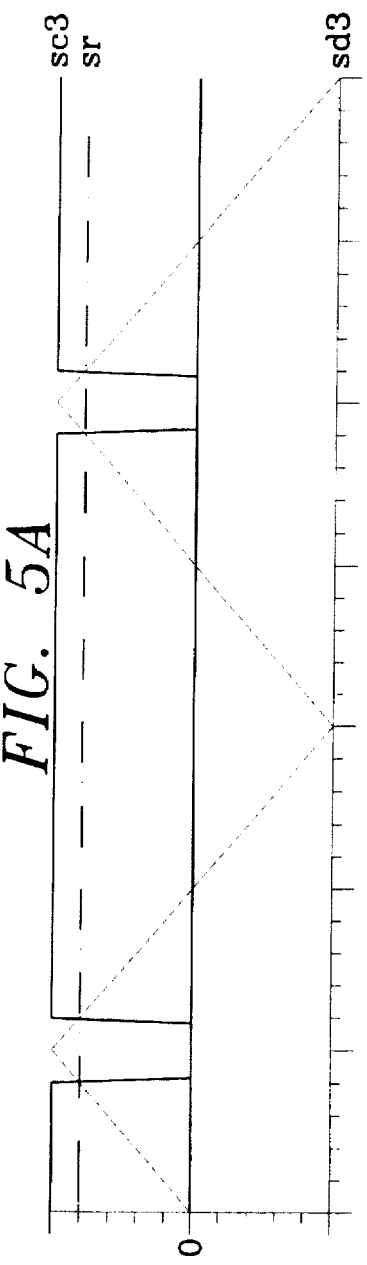
FIG. 5 illustrates the trace of various signals relative to the control portion of the device.
Figure 5B:
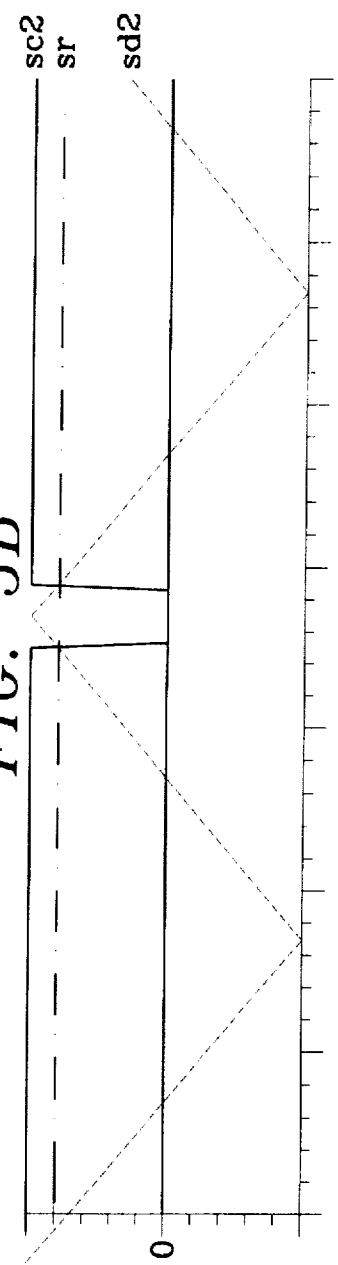
Figure 5C:
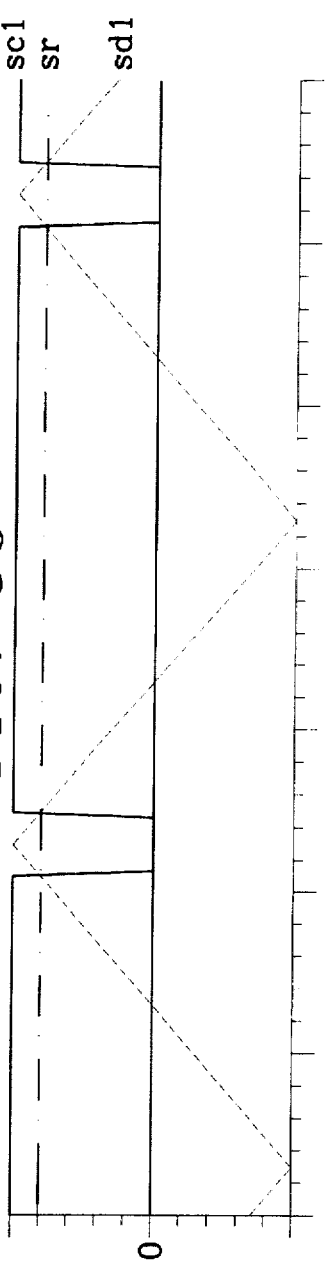

To this end, the synchronization means SYNCHRO comprises means for generating triangular phase shifted signals, comprised in the example shown by a triangular signal general OSCT which delivers a signal $sd_3$ of a frequency F the tracing of which is shown in FIG. 5, and for a phase shifter $RET_2$ of which the output is connected to another phase shifter $RET_1$. The phase shifters introduce a phase shift of $2\pi/n$, thus in the example $2\pi/3$. The signals issued from the generator OSCT ($sd_3$), from the phase shifter $RET_2$ ($sd_2$) and from the phase shifter $RET_1$ ($sd_1$) have relative phases of 0, $2\pi/3$ and $4\pi/3$, and are delivered respectively toward the logic control comparators $LG_3$, $LG_2$, $LG_1$. The control generator GP delivers as before the reference signal sr to the other input of the comparators. In the continuous/continuous application, the signal sr is continuous and varies as a function of the exchange of energy desired.

At the output of the comparators $LG_3$, $LG_2$, $LG_1$ appear the three control signals $sc_3$, $sc_2$, $sc_1$ comprised of the logic signals, of a value 1 when $sd_k < sr$, and a value of 0 in the opposite case.

These signals are delivered after adjustment on the control electrode of the switches $IA_3$, $IA_2$, $IA_1$.

Figure 6A:
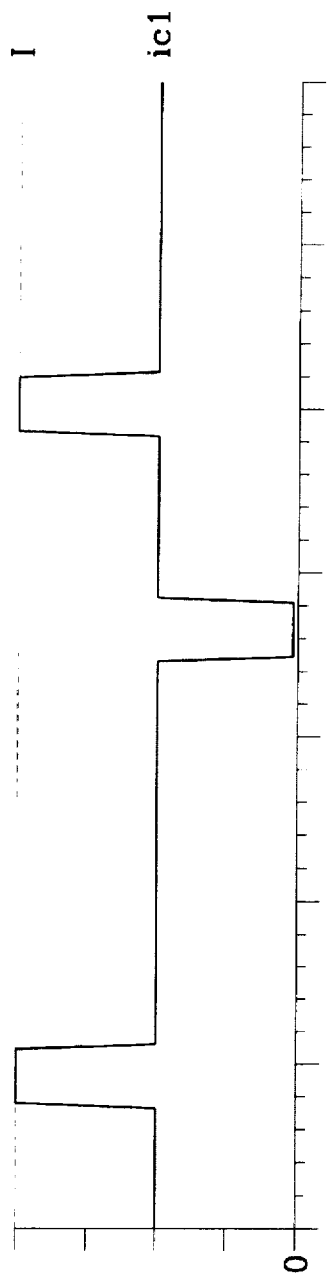
FIG. 6 illustrates the trace of currents and voltages in the power portion of this device.
Figure 6B:
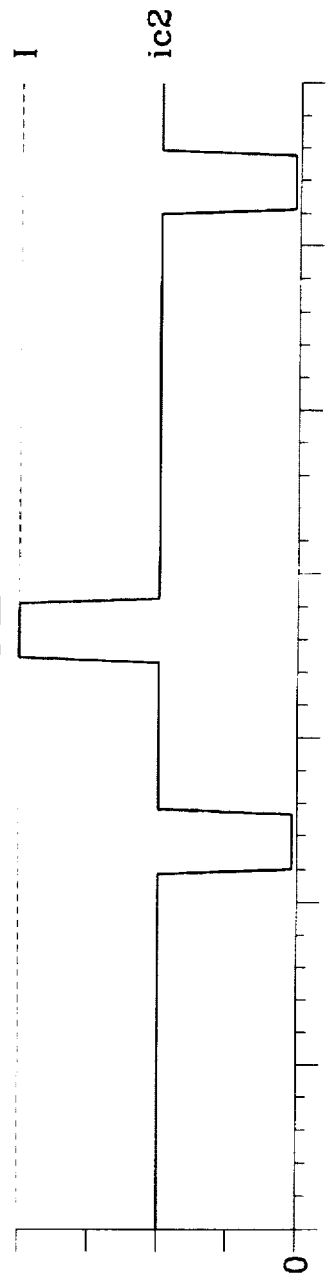
Figure 6C:
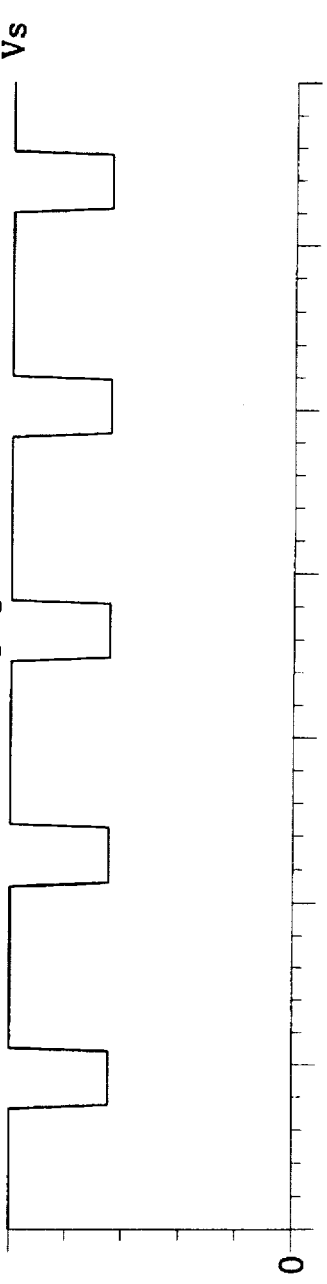

FIG. 6 shows the tracing of the currents $ic_1$, $ic_2$ which, traverse the capacitors $C_1$ and $C_2$ (the voltage source E is assumed perfect playing the role of the capacitor $C_3$). It may be verified that, when two successive cells are in different states $e_k$ and $e_{k+1}$, there is circulation of current I from the source J in one direction or the other, through the capacitor situated between the two cells concerned. On the contrary, the current in this capacitor is zero when the two cells are in the identical states.

The last diagram of FIG. 6 shows the output voltage $V_s$. This voltage has a wave with frequency 3F and amplitude E/3: these two conditions facilitate filtering of this voltage.

Figure 7:
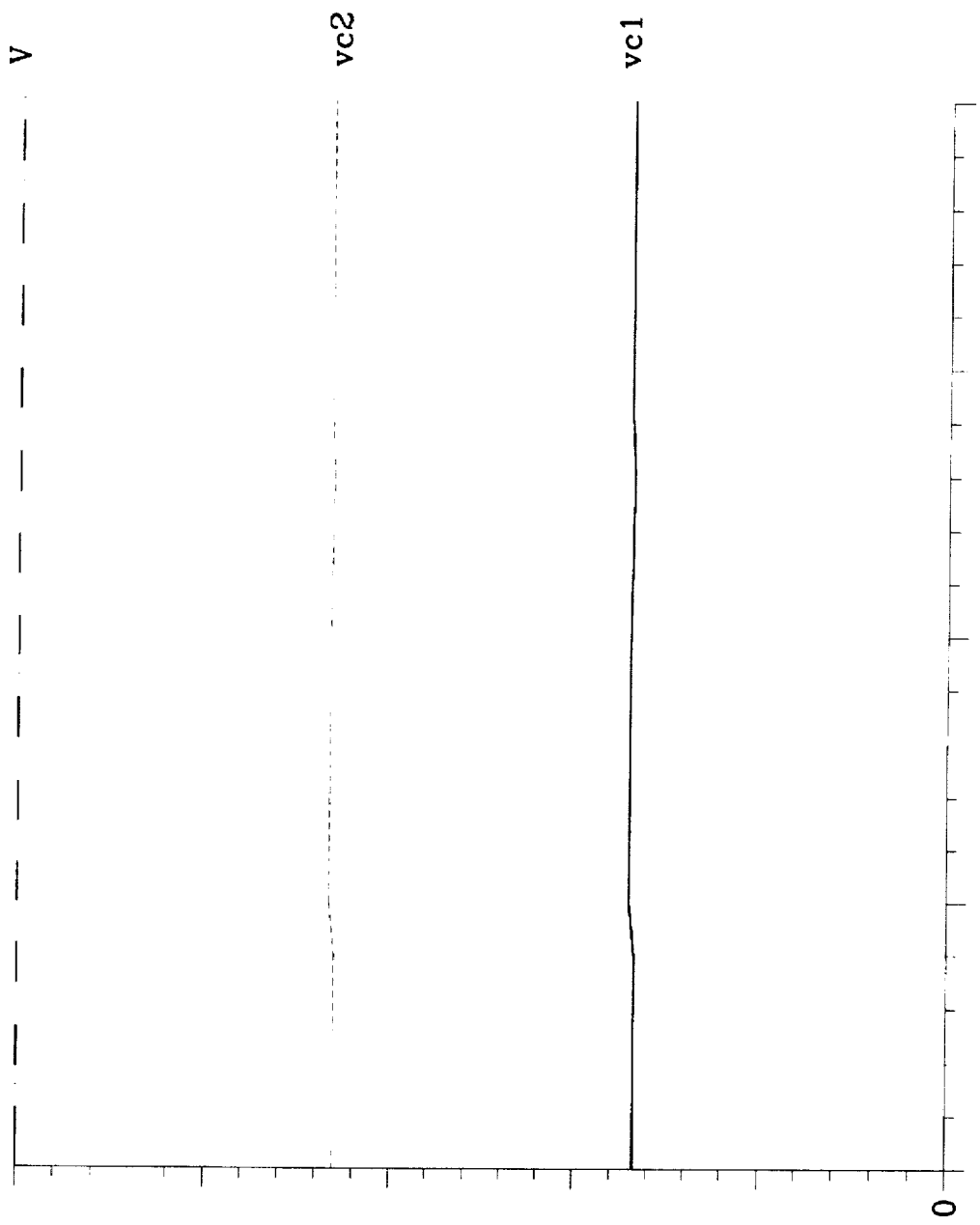
FIG. 7 illustrating the tracing of voltages at the capacitor terminals.

FIG. 7 illustrates the equilibrium of the voltages $V_{c1}$ and $V_{c2}$ at the terminals of the capacitors $C_1$ and $C_2$ by comparison of the continuous voltage V at the terminals of the voltage source E. It has been verified that the voltage $V_{ck}$ at the terminals of a capacitor k is essentially equal to kV/n (here kV/3).

The voltage at the terminals of a switch $I_{Ak}$ or $I_{BK}$ ($V_{IAK}$ or $V_{IBK}$) is either zero or equal to the difference in the voltages at the terminals of the two capacitors $C_{k-1}$ $C_k$ which surround it. It then follows that this voltage is limited to V/n (here V/3).

Figure 8:
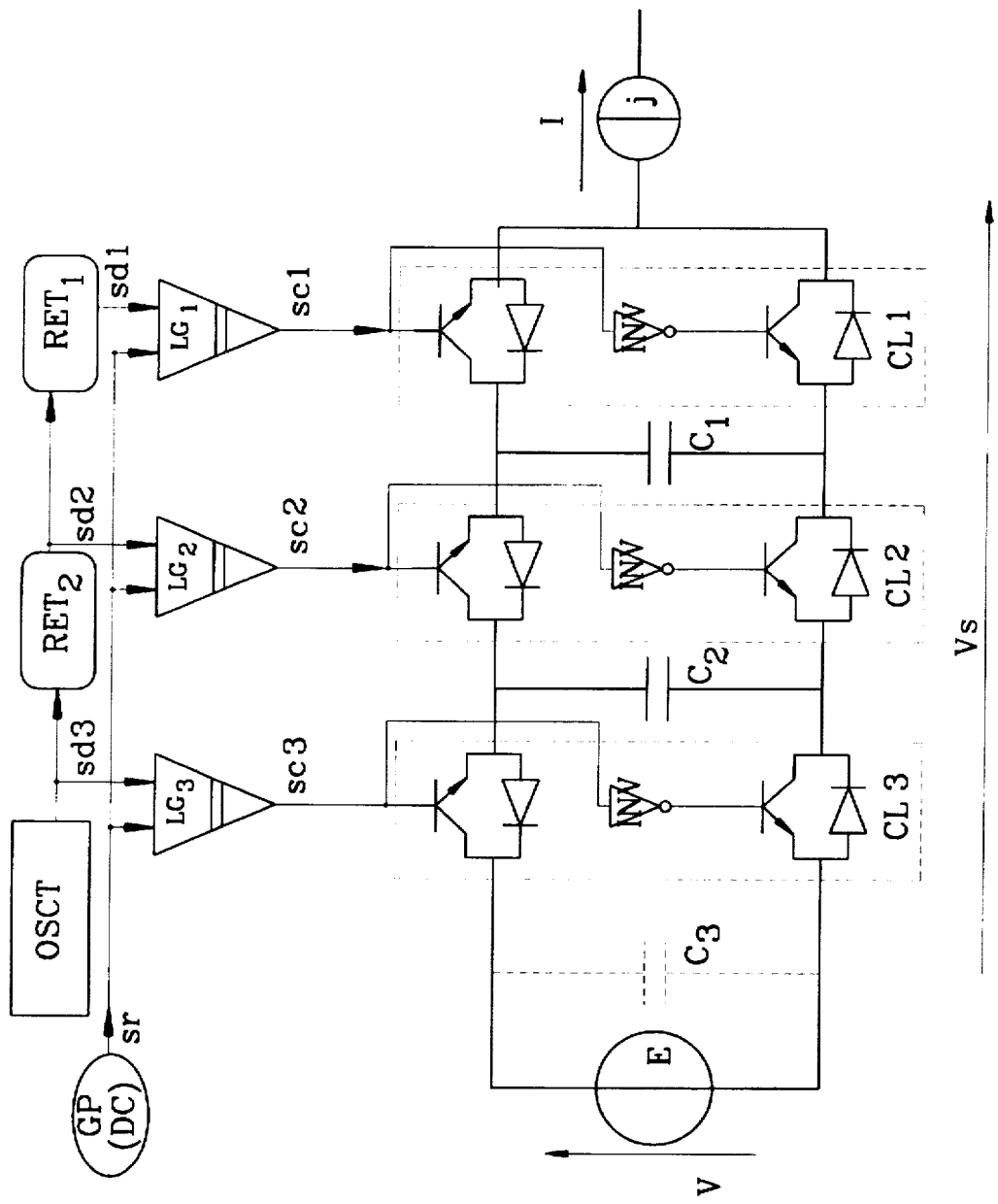
FIG. 8 is an electronic schematic of another embodiment in the case of a constant voltage source and a source of symmetric alternating current.

FIG. 8 is an example of an embodiment in the case of a source E of continuous voltage and a source J of symmetrical alternating current of a frequency fi (the frequency F of the switches being notably greater than the frequency fi). This example corresponds to a voltage inverter (direct/alternating converter) or, according to the reversibility, a current rectifier (alternating/direct converter).

In the example shown which also comprises three cells (but which may be generalized as n cells) all the switches $I_{A1}$, $I_{A2}$, $I_{A3}$, $I_{B1}$, $I_{B2}$, $I_{B3}$ are of the same type, reversible with respect to the current and unidirectional with respect to the voltage. In FIG. 8, they are comprised of double bipolar transistors, each with a non-parallel diode. Each of these bipolar transistors may be replaced, depending upon the applications, by a Darlington, MOST, GTO, IGBT . . . transistor.

In this application, the synchronization means SYNCHRO is adapted in such a manner that the control signals $sc_k$, $SC_{k+1}$ delivered to the two cells $CL_k$, $CL_{k+1}$ of successive ranks k and k+1 impose on these cells logic states $e_k$ and $e_{k+1}$ such that:

the logical size $e_k$ ET $\overline{e_{k+1}}$ is periodic, of a frequency 2fi, double the frequency of the current source J, the logical size $\overline{e_k}$ ET $e_{k+1}$ is equal periodic, with the same frequency 2fi.

To this effect, the control means GP is adapted to deliver a symmetrical alternating reference signal sr of frequency fi. Moreover, the synchronization means comprises means for generating symmetrical alternating triangular signals $sd_k$, composed in the example of n generators OSCT, $RET_2$, $RET_1$, corresponding to -n- cells and assign the same rank, the generators having the same amplitude and the same frequency -F- which is a multiple of the frequency fi for delivering triangular signals shifted in time such that the signal $Sd_{k+1}$ issued by the generator of rank k+1 is retarded in time by a value of 1/nF with respect to that of $sd_k$ issued by the generator of rank k.

The n logics $LG_k$ are each comprised of a comparator connected to the control means GP and to a triangular signal generator, the comparator which is connected to the generator of rank k being connected to the switching cell of rank k for controlling the same as a function of the relative values of the two signals ($sd_k$, sr) which it receives.

As previously, the triangular signal generators may be comprised of an oscillator OSCT and a series of phase shifters $RET_k$ $2\pi/n$ in such a manner as to deliver triangular signals shifted by $2\pi/n$ for a signal with respect to the succeeding signal.

Figure 9A:
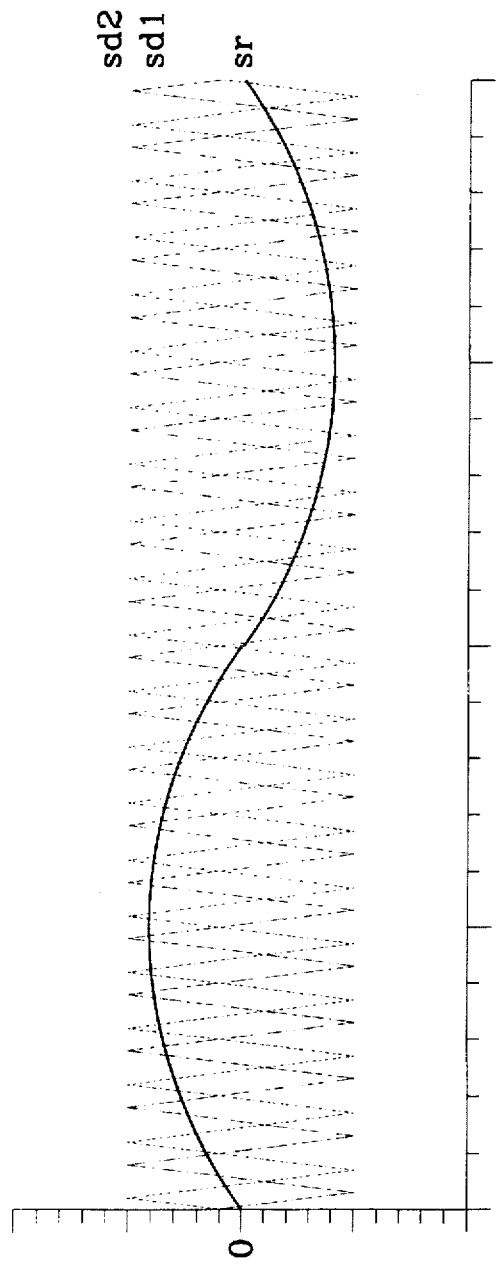
FIG. 9 illustrates the tracing of various signals relative to the control portion of this apparatus.
Figure 9B:
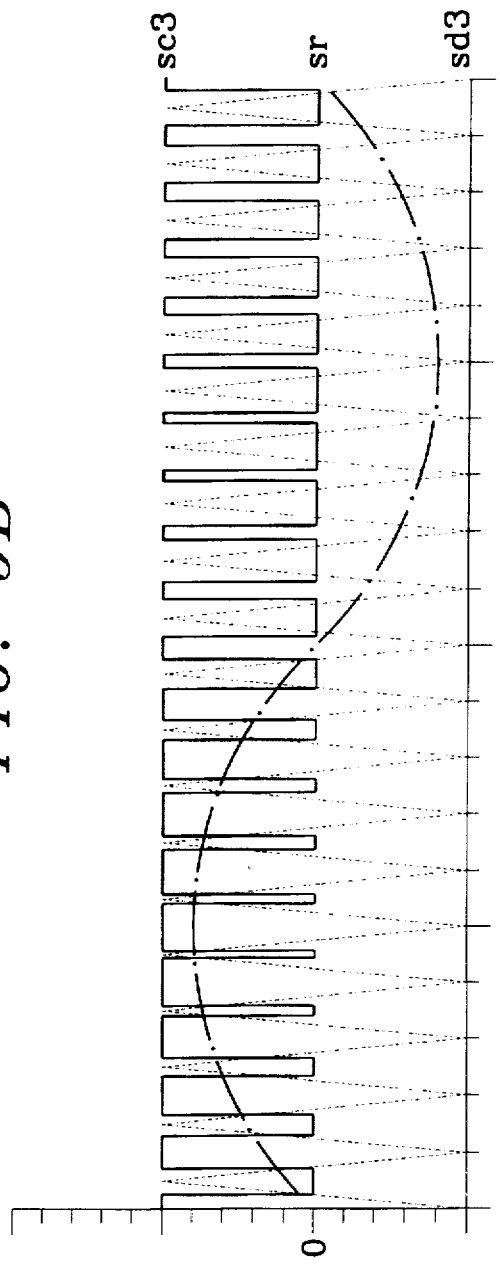

At the output of the comparators $LG_3$, $LG_2$, $LG_1$ of the control logics, appear control signals $sc_3$, $sc_2$, $sc_1$ which have characteristics similar to those already described above. These signals which are represented in FIG. 9 are delivered to the switches $I_{A1}$, $I_{A2}$, $I_{A3}$. The conditions already explained in the preceding embodiment are verified in this case. After inversion and galvanic isolation in the circuits $INV_k$, these signals assure the control of the three other switches $I_{B3}$, $I_{B2}$, $I_{B1}$.

FIG. 10 shows the tracing of the currents which pass through the capacitors $C_1$ and $C_2$. The same comments as in the preceding case may be formulated here. The last diagram of FIG. 10 shows the voltage of the output $V_s$: as before, this voltage has a ripple frequency nF and amplitude E/n (n=3 in the case shown of three cells).

Figure 11:
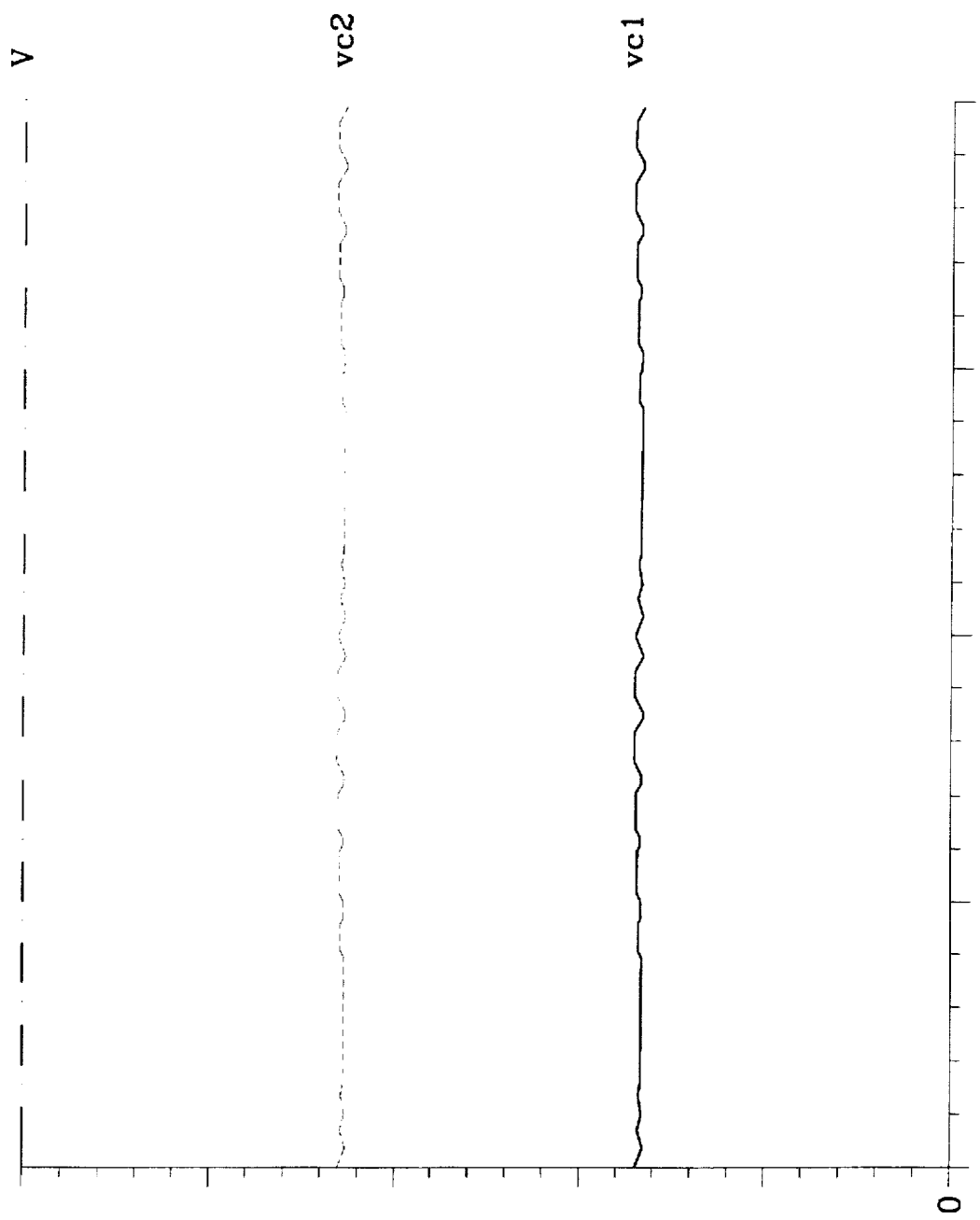
FIG. 11 illustrating the tracing of voltages at the capacitor terminals.

FIG. 11 illustrates the equilibrium of the voltages at the terminals of the capacitors: the voltage $V_{ck}$ at the terminals of the capacitor of rank k is essentially equal to kV/n. In other words, in this case as well, the voltage at the terminals of a switch is limited to V/n (here V/3).

Figure 12:
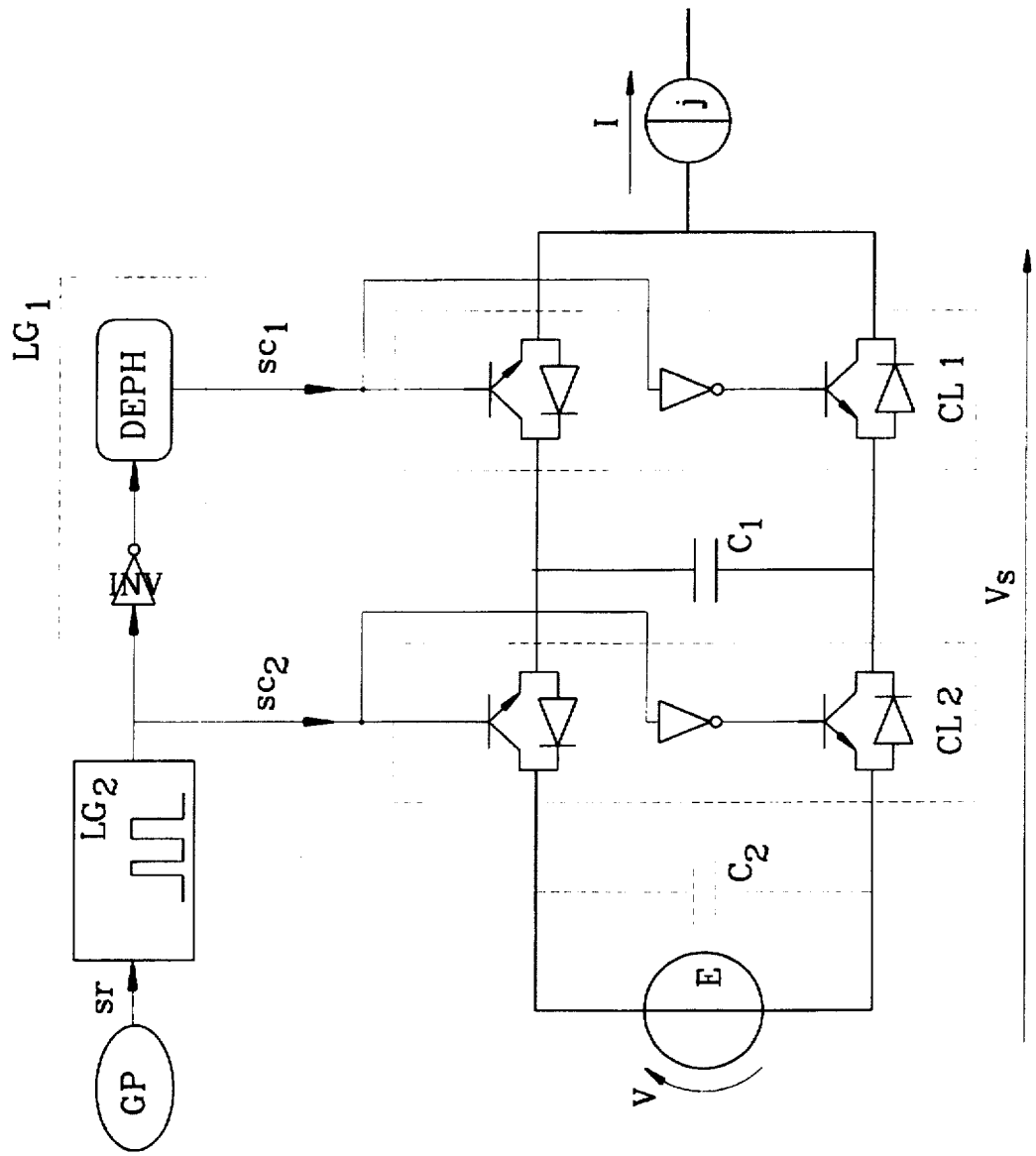
FIG. 12 is a schematic view of a variation of the device of FIG. 8, provided with two switching cells.

FIG. 12 shows a variation of the device shown in FIG. 8 (source of continuous voltage E and source of symmetrical alternating current of frequency fi). In the device of FIG. 12, the number n of cells is equal to 2 and the switching frequency F is equal to the frequency fi of the current source. The power portion of the device is similar to that of FIG. 8. The reference signal sr issued by the control generator is treated in the control logic $LG_2$ associated with the second cell in such a manner as to deliver a control signal $sc_2$ of a frequency fi. This control logic $LG_2$ may for example be comprised of a memory device storing predefined control commands which are read at the frequency F=fi and selected as a function of the signal sr. This signal which serves to control the cell $CL_2$ (after inversion for the switch of the series B) is received by the logic $LG_1$ attached to the cell $CL_1$ in order to deliver a control signal $sc_1$ to said cell $CL_1$. The control signals $sc_1$ and $sc_2$ impose on these cells logic states $e_1$ and $e_2$ such that $e_2$ is obtained in complement to $e_1$ and while shifting it one half-period 1/2F.

To this end, the logic $LG_1$ may in particular be comprised of an inverter followed by a $\pi$ phase shifter DEPH. As the case may be, the signal $sc_1$ may be stored (as the signal $sc_2$) in memory for being read at the frequency F=fi.

FIG. 13 illustrates the control signals $sc_2$ and $sc_1$. The last diagram of this figure illustrates in dashed lines the current I of the source J and in solid lines, the current $I_{c1}$ circulating in the capacitor $C_1$. It is noted that this current has an average value of zero.

Figure 14A:
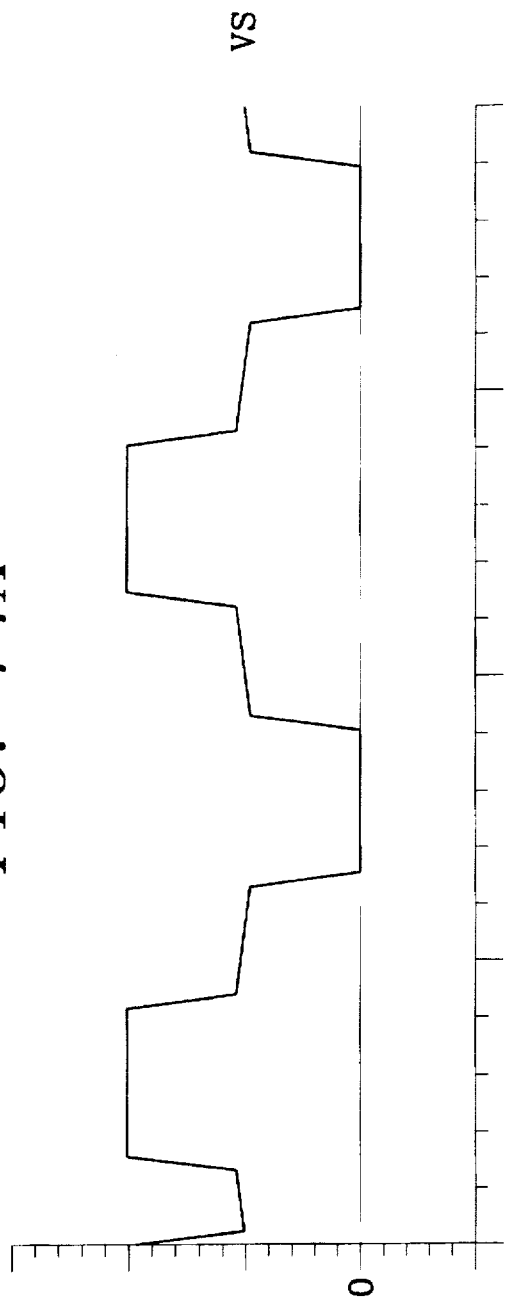
Figure 14B:
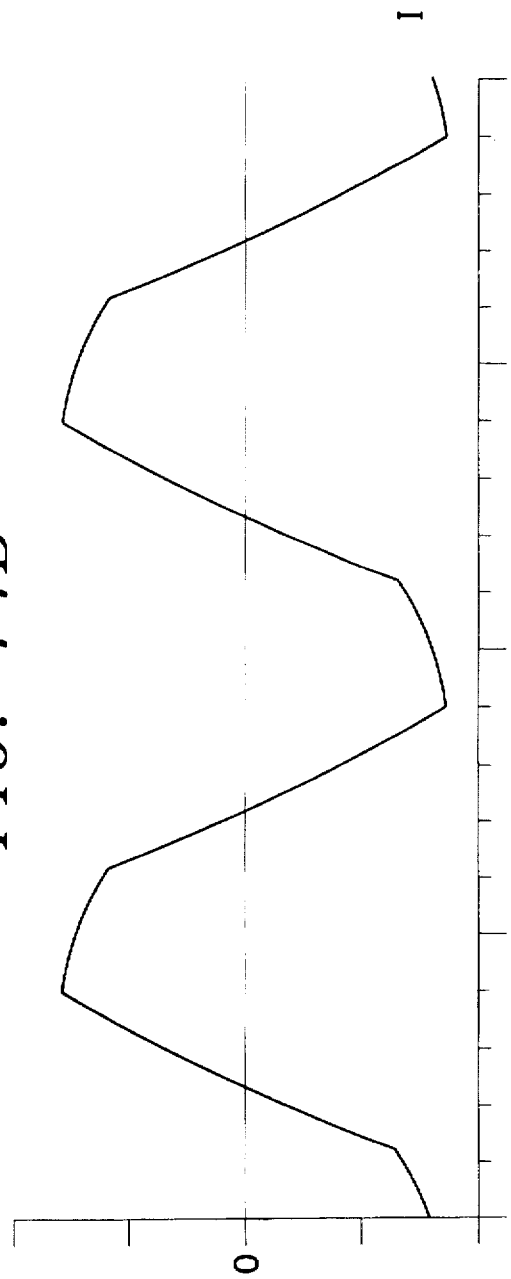

FIG. 14 illustrates the tracing of the voltage $V_s$ at the output of the system (which is a three level voltage). The voltage $V_{c1}$ at the terminals of the capacitor $C_1$ is therefor essentially equal to V/2 and the voltage at the terminals of the switch $I_{A1}$ is limited to V/2.

Figure 15:
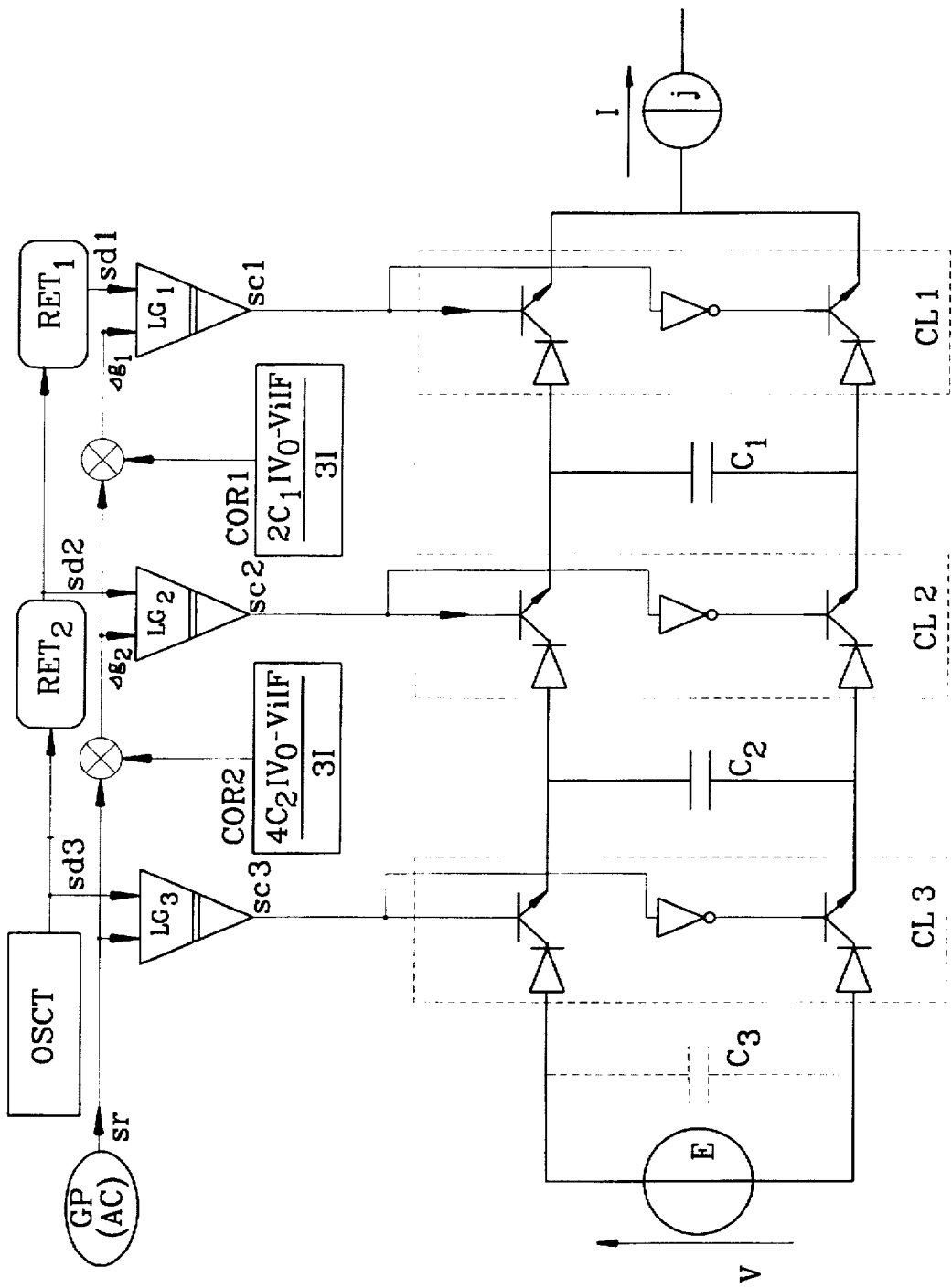
FIG. 15 is an electronic schematic view of another embodiment in the case of an alternating voltage source and a constant current source.

FIG. 15 is an example of an embodiment of the device in the case of a symmetrical alternating voltage source E of a frequency fv, and a continuous current source J (the frequency F of the switchings being notably greater than this frequency fv). This example corresponds to an alternating/continuous and/or a continuous/alternating converter (rectifier or reversible current inverter).

In the example shown which comprises three cells (but which may be generalized as n cells), all of the switches $I_{A1}$, $I_{A2}$, $I_{A3}$, $I_{B1}$, $I_{B2}$, $I_{B3}$ are of the same type, reversible with respect to voltage and unidirectional as to current. In FIG. 15, they are comprised of bipolar transistors each arranged in series with a diode. Each of these transistors may be replaced depending upon the applications, by a Darlington, MOST, GTO (not necessarily needing a series diode), IGBT . . . transistor.

In this application, the synchronization means is adapted such that the control signals $sc_k$, $sc_{k+1}$ delivered to the two cells $CL_k$, $CL_{k+1}$ of the successive ranks k and k+1 impose on these cells logic states $e_k$ and $e_{k+1}$ such that, for each period 1/F, the difference between the duration of the state $e_k$ AND $e_{k+1}=1$ and the duration of the state $e_k$ AND $e_{k+1}$ is essentially equal to $$\frac{c_k}{I} \times \frac{k}{n} |V_0 - V_1|$$

where $c_k$ is the capacitance of the capacitor of rank k,
I is the value of the current at the current source,
$V_0$ is the voltage at the terminals of the voltage source at the beginning of the period 1/F considered, and $V_1$ is this voltage at the end of said period.

Figure 16A:
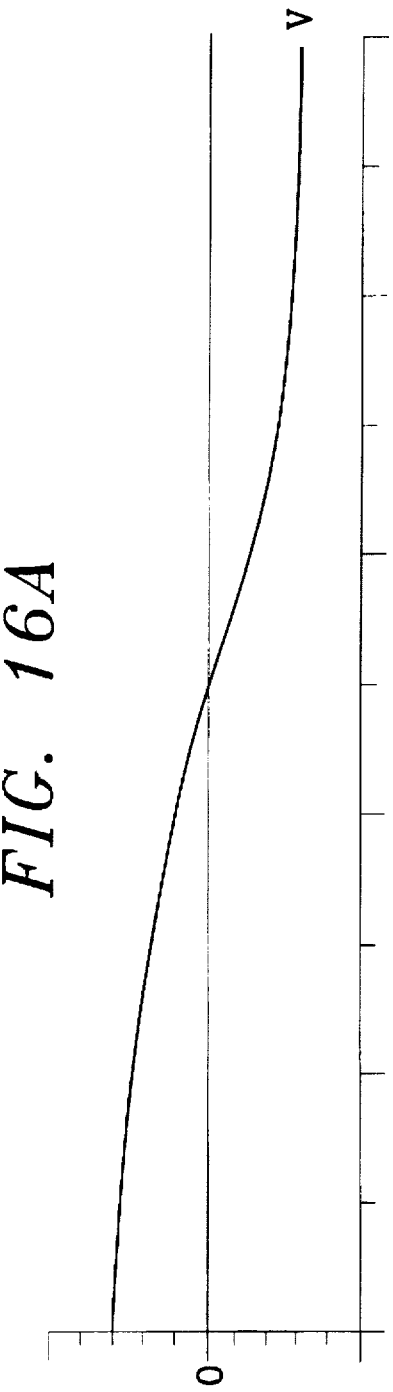
FIGS. 16, 17, 18, 19, 20 and 21 illustrate the tracing of signals of the device of FIG. 15.
Figure 16B:
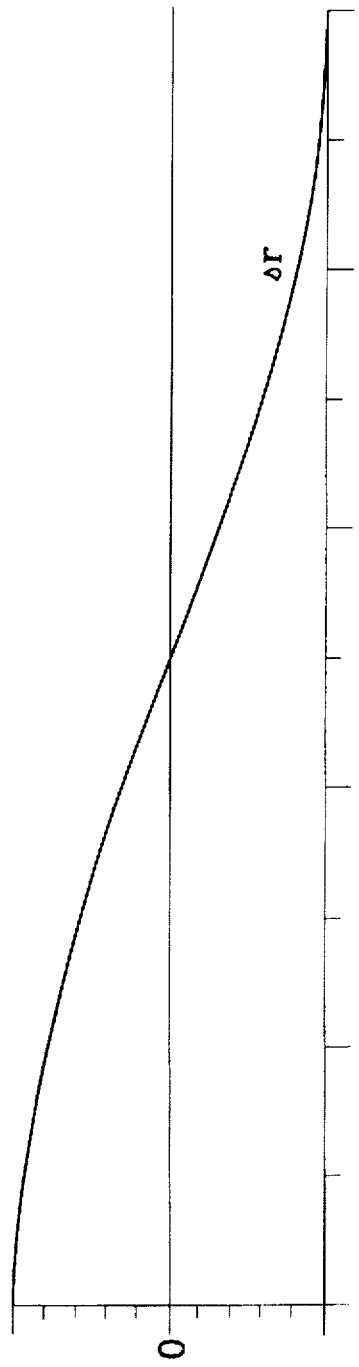
Figure 17:
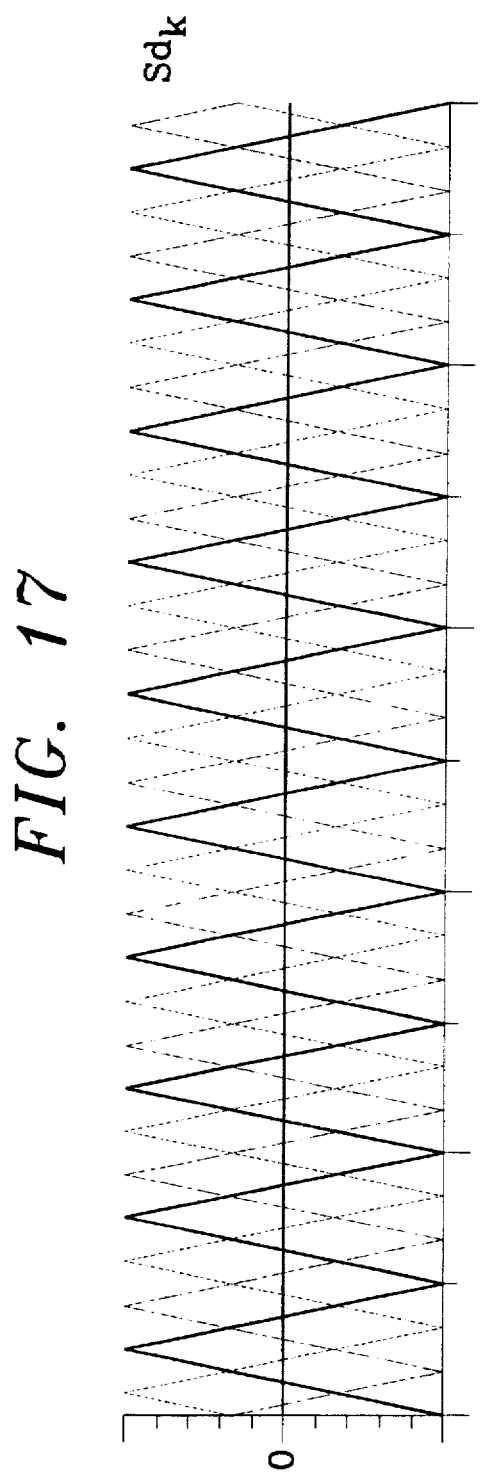

To this end, the control means is adapted to deliver a reference signal sr of alternative symmetry of frequency fv,
which is illustrated in FIG. 16. Moreover, the synchronization means SYNCHRO comprises:

means for generating n triangular signals of alternative symmetry $sd_k$, composed in the example of n generators OSCT, $RET_2$, $RET_1$, corresponding to n cells and assuming the same rank, the generators having the same amplitude and the same frequency -F- which is a multiple of the frequency fv for delivering triangular signals shifted over time such that the signal $sd_{k+1}$ issued from the generator of rank k+1 is delayed in time by a value 1/nF with respect to signal $sd_k$ issued from the generator of rank k (FIG. 17), correctors $COR_k$ corresponding to the cells and assigned the same rank, each corrector being connected to the control means and adapted to deliver a corrected reference signal $sg_k$ of a relative amplitude $g_k$ with respect to that of the triangular signals $sd_k$, such that $$|g_k - g_{k+1}| = \frac{2c_k}{I} \times \frac{k}{n} |V_0 - V_1| \times F$$

The logics $LG_k$ are each comprised of a comparator receiving a triangular signal $sd_k$ and receiving a corrected reference signal $sg_k$, the comparator which is connected to the generator of rank k being connected to the switching cell of rank k for controlling the same as a function of the relative values of the two signals $sd_k$, $sg_k$ which it receives.

Figure 18:
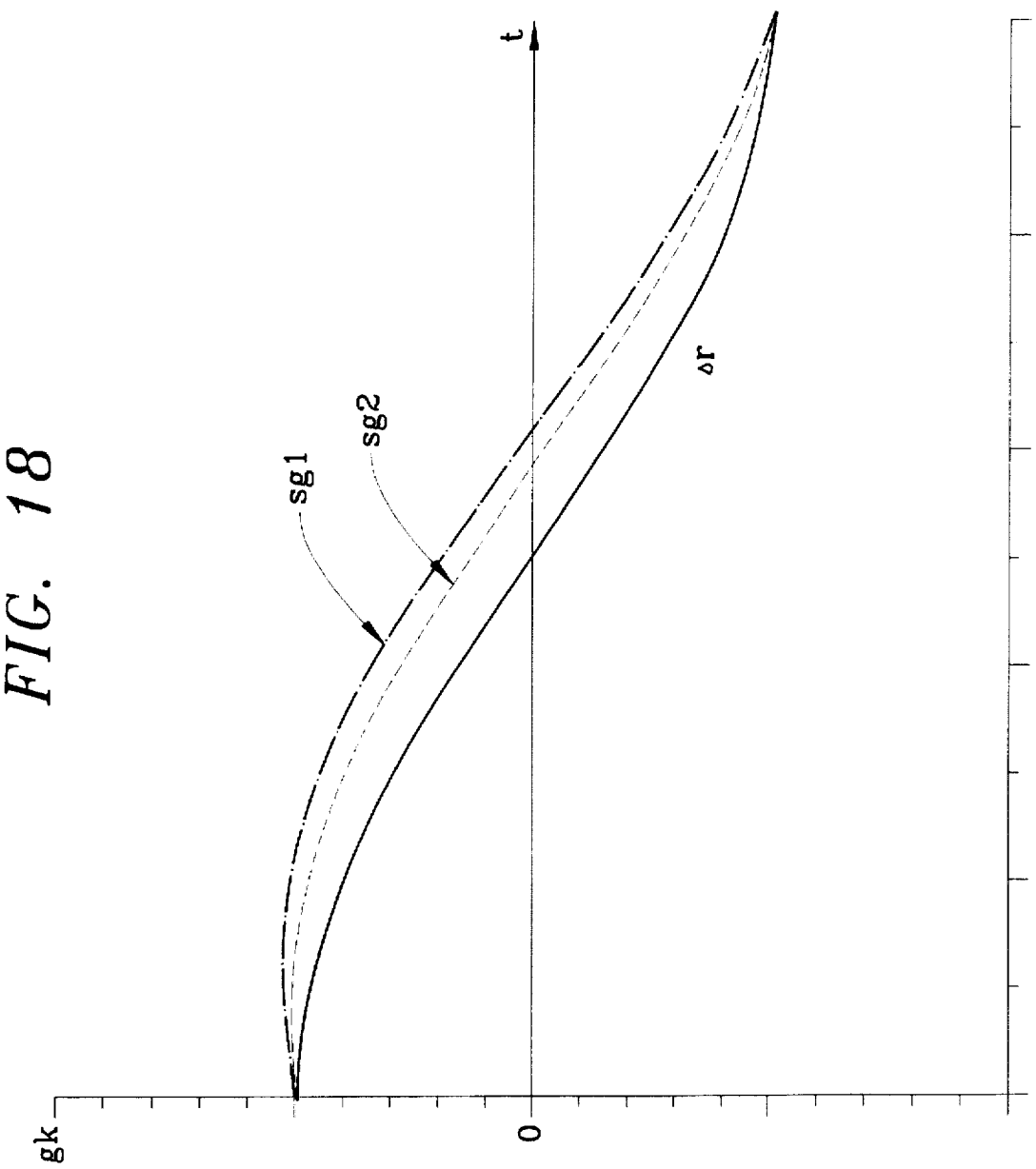

The corrected reference signals $sg_k$ are illustrated in FIG. 18.

As before, the triangular signal generators may be comprised of an oscillator OSCT and a succession of phase shifters $RET_k$ $2\pi/n$ in such a manner as to deliver triangular signals shifted by $2\pi/n$ for a signal with respect to the following one.

Figure 19A:
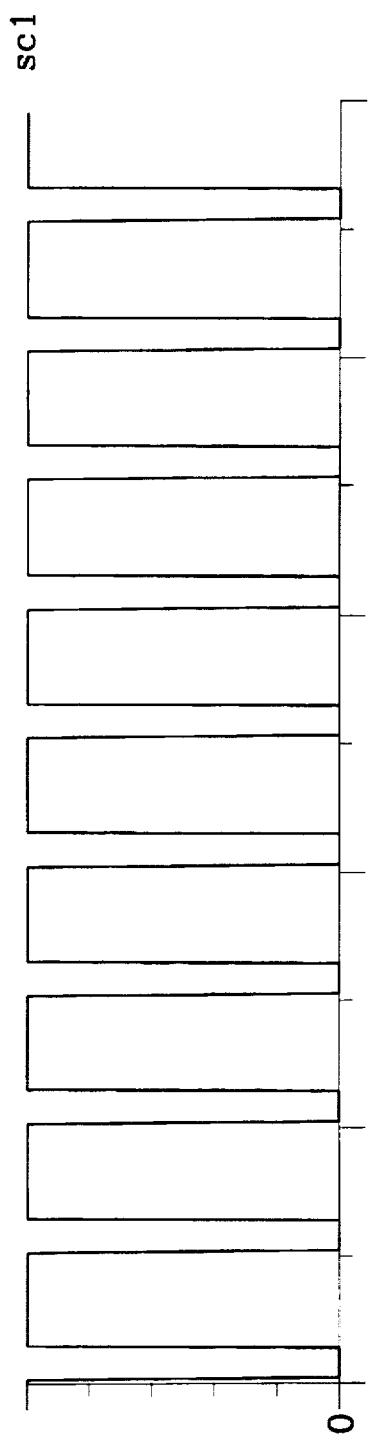
Figure 19B:
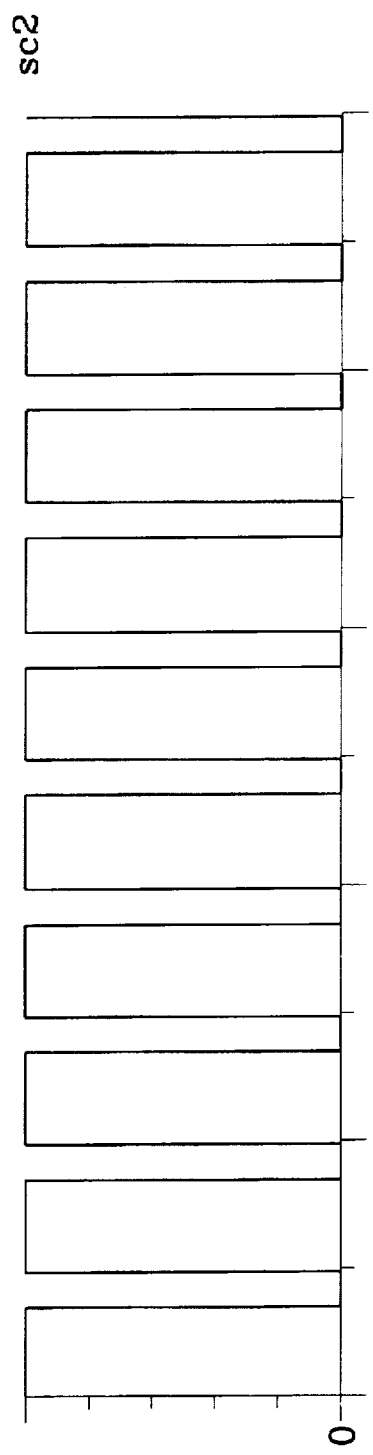

As the output of the comparators $LG_3$, $LG_2$, $LG_1$ of the control logics, appear the control signals $sc_3$, $sc_2$, $sc_1$ which have similar characteristics to those described previously. These signals which are shown in FIG. 19 are delivered to the switches $I_{A3}$, $I_{A2}$, $I_{A1}$. The conditions already described in the previous embodiments are verified in the present case. After inversion and galvanic isolation in the circuits $INV_k$, these signals assure the control of the three other switches $I_{B3}$, $I_{B2}$, $I_{B1}$.

Figure 20A:
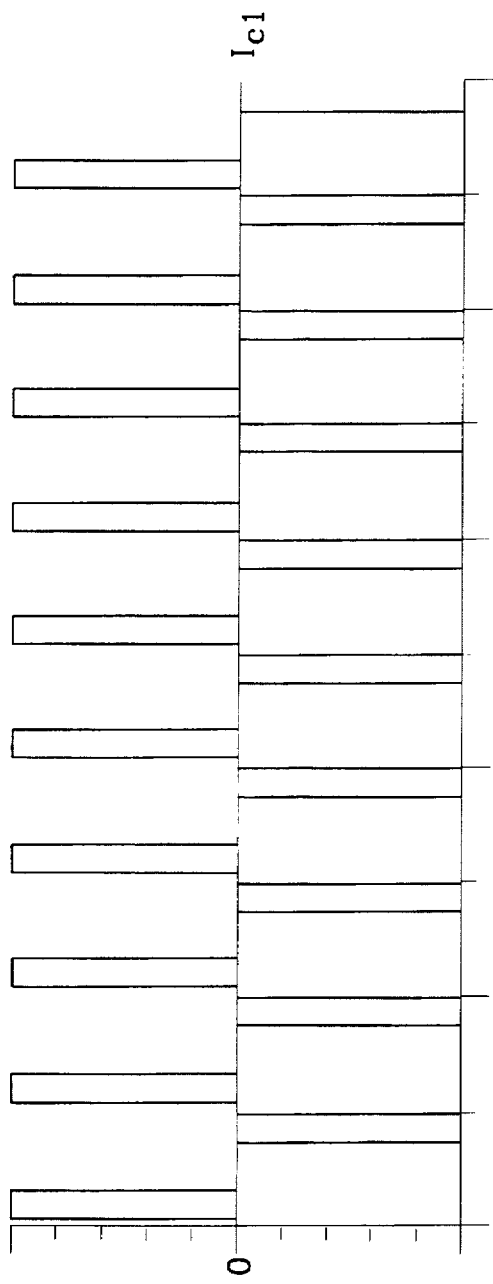
Figure 20B:
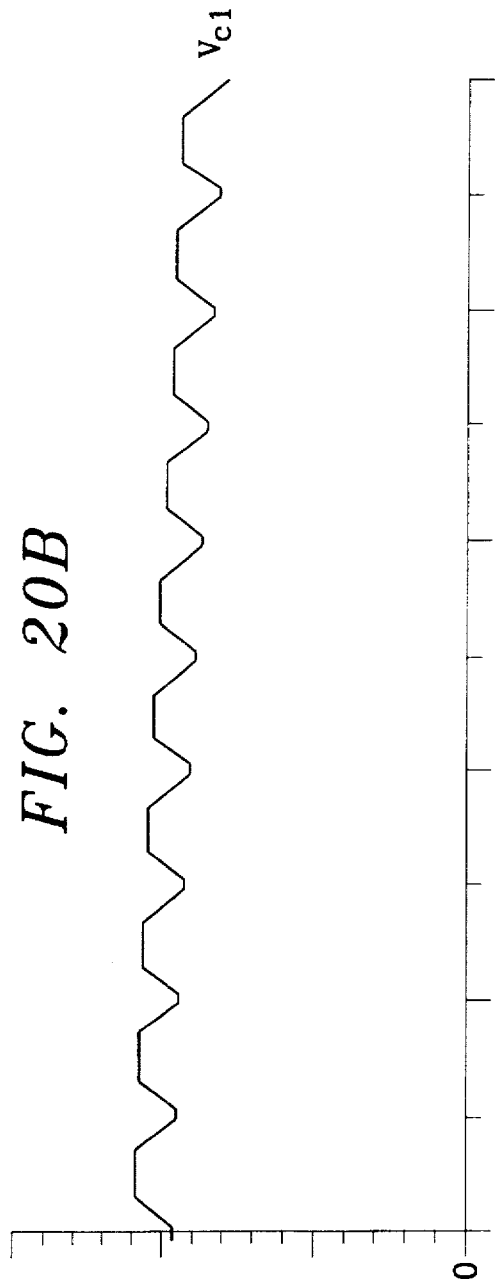

FIG. 20 shows a tracing of the current $I_{c1}$ which passes through the capacitor $C_1$ and that of the voltage $V_{c1}$ at its terminals.

Figure 21:
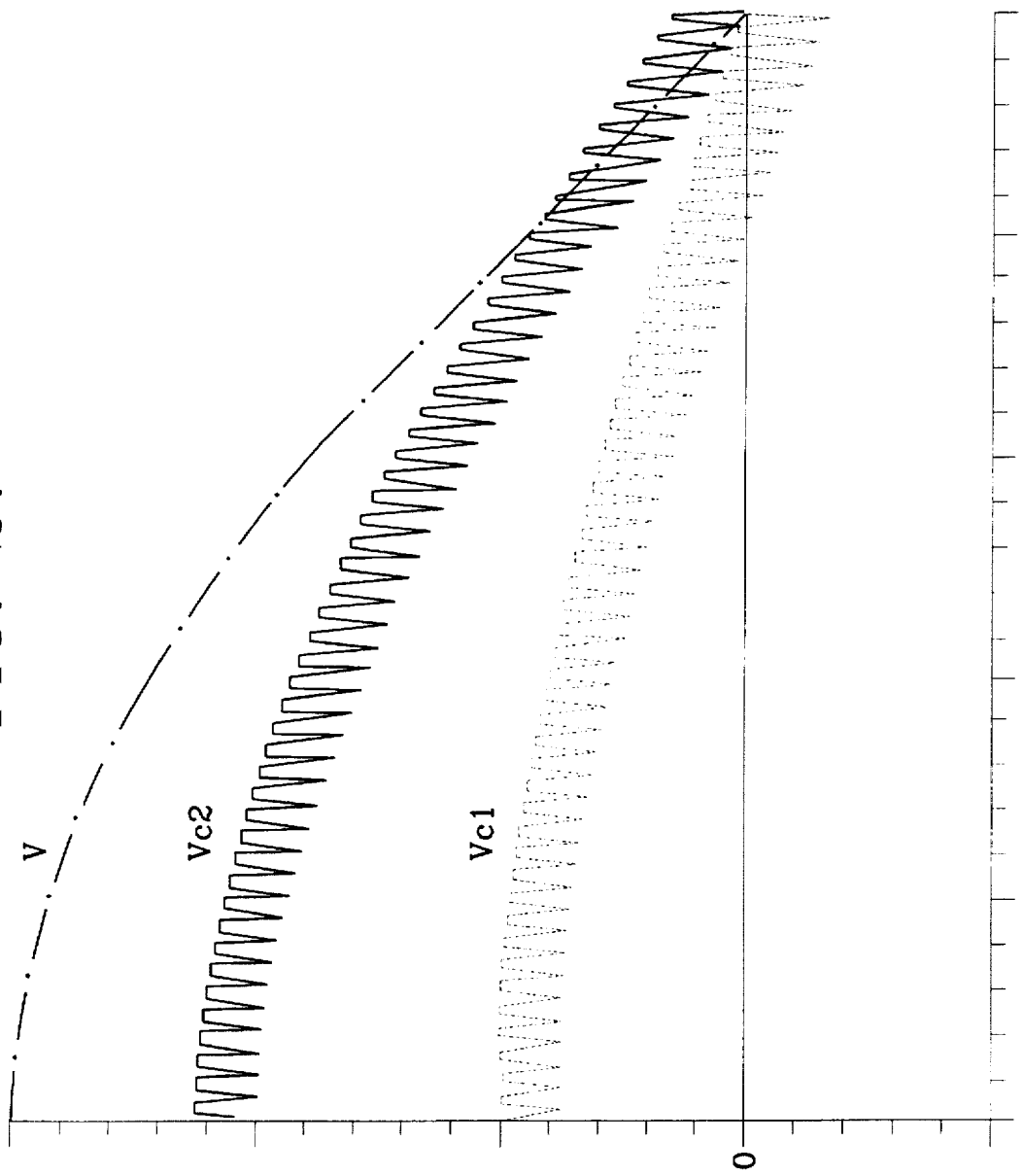

It is to be noted that the current $I_{c1}$ presents an average value not zero, appropriate for provoking a variation of the voltage $V_{c1}$ proportional to the variation of the voltage V at the terminals of the source E. The macroscopic variation of the voltage $V_{c1}$ is better illustrated in FIG. 21. This figure shows also that the voltages $V_{ck}$ at the terminals of the capacitors varies proportionally to their rank k.

Figure 22:
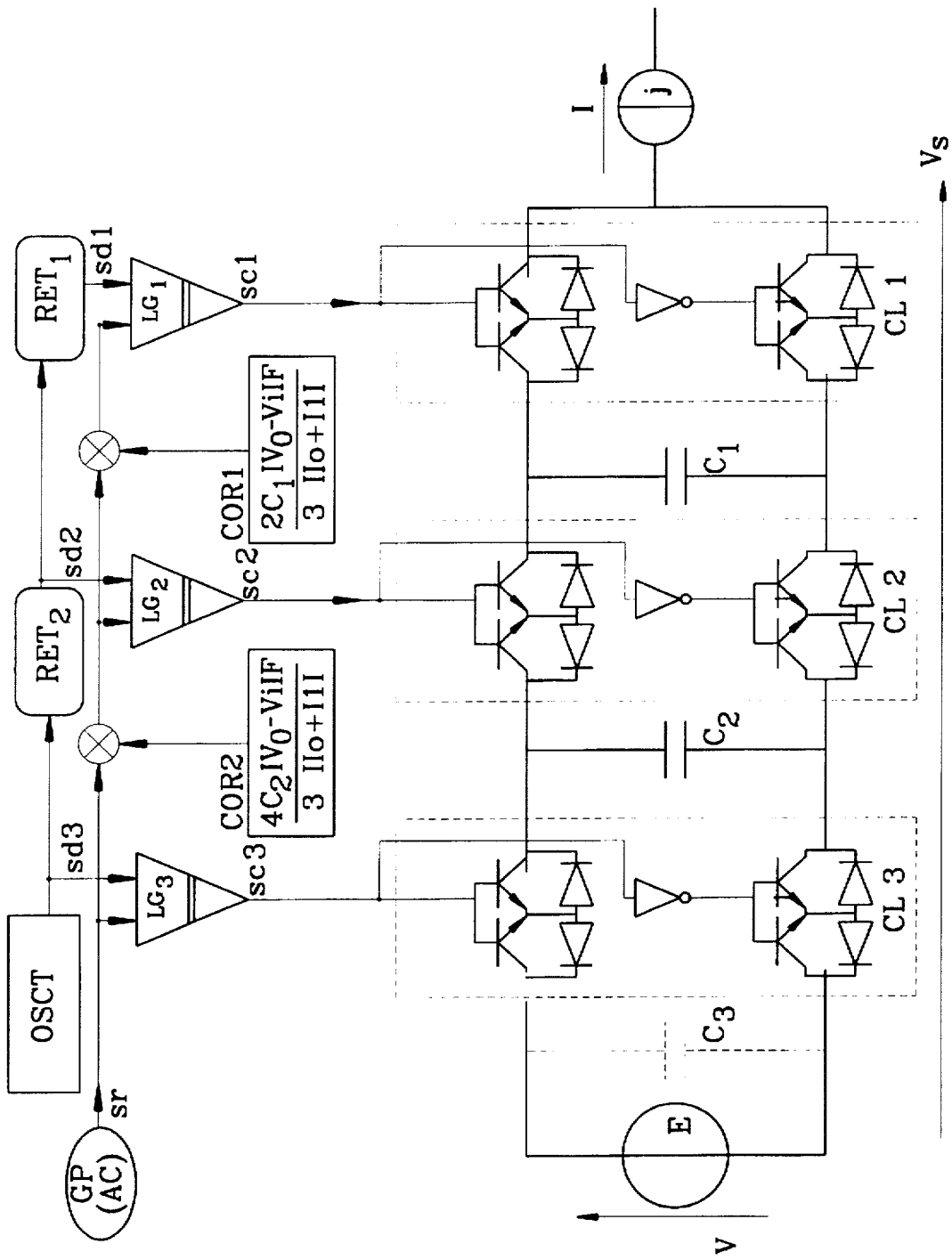
FIG. 22 is an electronic schematic view of another embodiment in the case of an alternating voltage source and an alternating current source.
Figures 23A, 23B:

FIG. 22 is an example of an embodiment of the device in the case of a source E of symmetrical alternating voltage of a frequency fv and a source J of symmetrical alternating current fi (the frequency F of the switchings being notably greater than the frequency fi and fv). This example corresponds to an alternating/alternating converter (for example a frequency changing converter designated as a "cycloconverter").

In the example shown which comprises three cells (but which may be generalized as n cells), all of the switches $I_{A1}$, $I_{A2}$, $I_{A3}$, $I_{B1}$, $I_{B2}$, $I_{B3}$ are of the same type, reversible with respect to voltage and current. In FIG. 22, they are comprised of bipolar transistors associated per pair in anti-series manner, each being provided with a diode in anti-parallel. Each of these transistors may be replaced, according to the applications, by a Darlington, MOST (the diode may be the internal diode of the MOST), GTO, IGBT . . . transistor.

In this application, the synchronization means SYNCHRO is adapted in such a manner that the control signals $sc_k$, $sc_{k+1}$ delivered to the two cells $CL_k$, $CL_{k+1}$ of successive ranks k and k+1 impose on these cells logic states $e_k$ and $e_{k+1}$ such that, over each period 1/F, the difference between the period of the state $\overline{e_k}$ AND $e_{k+1}=1$ and the period of the state $e_k$ AND $\overline{e_{k+1}}=1$ are essentially equal to:

$$2c_k \times \frac{k}{n} \times \frac{V_0 - V_1}{I_0 + I_1}$$

where $c_k$ is the capacitance of the capacitor of rank k, $I_0$ and $V_0$ are the values of the sources of current and voltage at the start of the period 1/F considered, and $I_1$ and $V_1$ are these values at the end of said period.

The control means GP delivers a reference signal sr adapted to control the exchange of energy. In the example shown, this reference signal is of alternating frequency fv. The synchronization means SYNCHRO comprises:

means for generating triangular signals of alternating symmetry $sd_k$, comprised in the example by n generators OSCT, $RET_2$, $RET_1$, corresponding to -n- cells and assumed to be the same rank, the generators having the same amplitude and a same frequency -F- (notable greater than the frequencies fi and fv), said generators being shifted in time such that the triangular signal $sd_{k+1}$ issuing from the generator of rank k+1 is delayed in time by a value of 1/nF with respect to the signal $sd_k$ issued by the generator of rank k (FIG. 24), correctors $COR_k$, corresponding to the cells and assumed to be of the same rank, each corrector being connected to control means GP and adapted to deliver a corrected reference signal $sg_k$ of a relative amplitude $g_k$ with respect to that of the triangular signals $sd_k$, such that $$|g_k - g_{k+1}| = \frac{4c_k}{I_0 + i_1} \times \frac{k}{n} |V_0 - v_1| \times F$$

The n logics $LG_k$ are each comprised of a comparator receiving a triangular signal $sd_k$ and a corrected reference signal $sg_k$, the comparator which is connected to the generator of rank k being connected to the switching cell $CL_k$ of rank k for controlling the same as a function of the relative values of the signals $sd_k$, $sg_k$ which it receives.

Figure 24A:
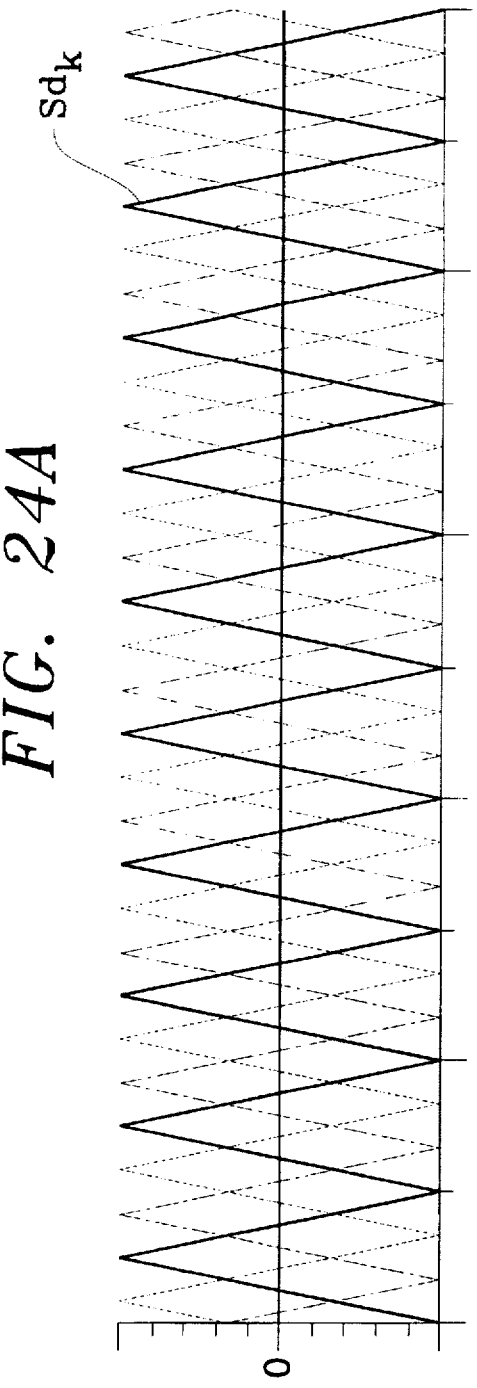
Figure 24B:
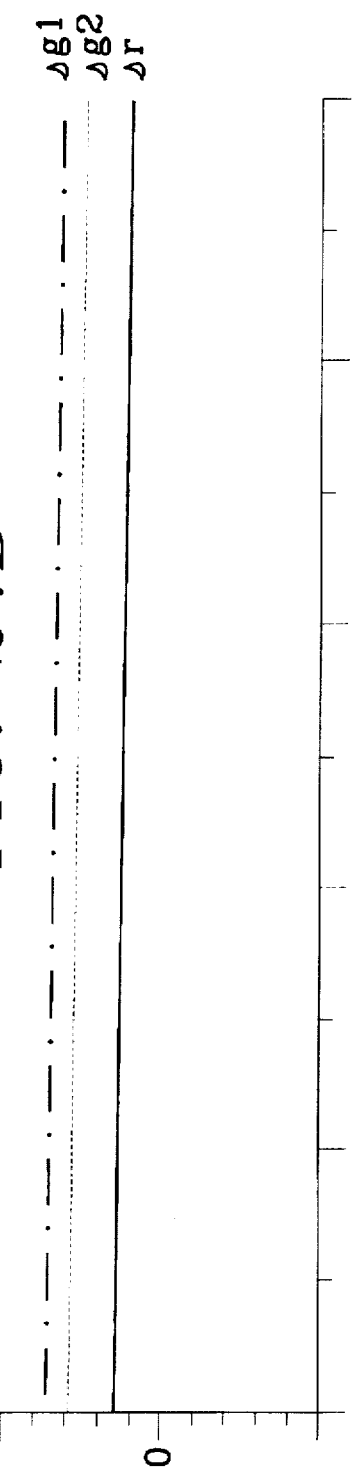

The triangular signals $sd_k$ issued from the generators and the corrected reference signals $sg_k$ are illustrated in FIG. 24.

As before, the triangular signal generators may be comprised by an oscillator OSCT and by a succession of phase shifters $RET_k$ $2\pi/n$ for one signal relative to the successive one.

At the output of the comparators $LG_3$, $LG_2$, $LG_1$ of the control logics; appear control signals $sc_1$, $sc_2$, $sc_3$ which have characteristics similar to those already described previously. These signals which are shown in FIG. 25 are delivered to the switches $I_{A3}$, $I_{A2}$, $I_{A1}$. The conditions already described in the preceding embodiments are verified in the present case. After inversion and galvanic isolation in the circuits $INV_k$, these signals assure the control of the three other switches $I_{B3}$, $I_{B2}$, $I_{B1}$.

FIG. 26 shows the tracing of the current $I_{c1}$ which traverses the capacitor $C_1$ and that of the voltage $V_{c1}$ at its terminals.

Figure 27:
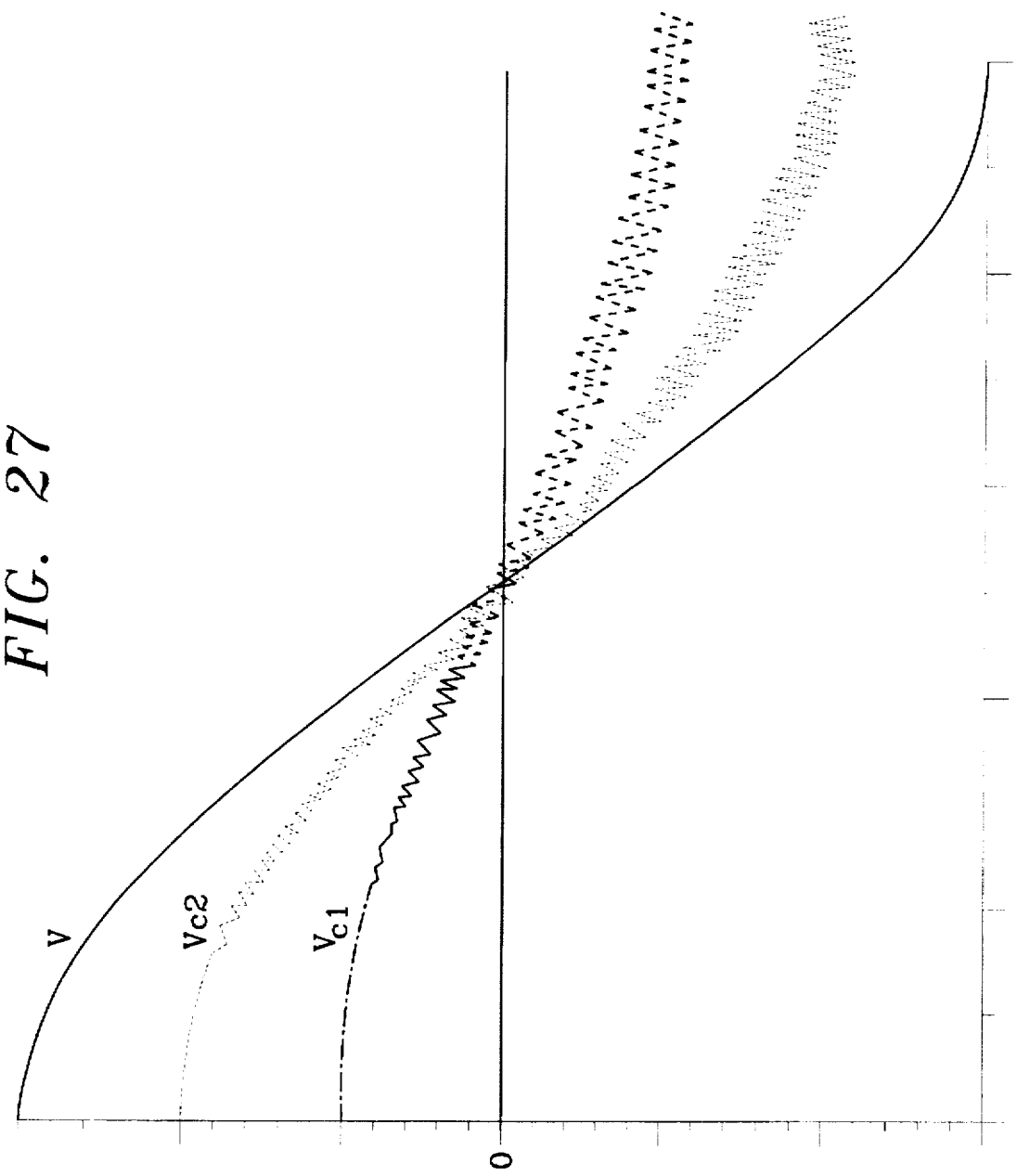

It is to be noted that the current $I_{c1}$ has an average value not zero, appropriate to cause a variation of the voltage $V_{c1}$ proportional to the variation of the voltage V at the terminals of the source E. The macroscopic variation of the voltage $V_{c1}$ is better seen in FIG. 27. This figure shows as well the voltages $V_{ck}$ at the terminals of the capacitors varying proportionally according to their rank k.

We claim:

1. An electronic device for the conversion of electric energy between a voltage source and a current source, comprising n controllable switching cells ($CL_1$ ... $CL_k$ ... $CL_n$) each comprising two switches ($I_{Ak}$, $I_{Bk}$) with $n \geq 2$, each cell being identified by a rank k such that $1 \leq k \leq n$, a control logic ($LG_k$) connected to each switching cell ($CL_k$) for delivering thereto control signals ($sc_k$) of a frequency F, for assuring opposed switchings of the two switches of the cell, control means (GP) for delivering to said control logic a reference signal (sr) as a function of the energy conversion desired, -n- homologous switches of the cells being connected in series and the -n- other homologous switches themselves being connected in series, in such a manner as to provide two symmetrical series, termed series A and series B, in which the two switches ($I_{Ak}$, $I_{Bk}$) of a given cell occupy symmetrical positions with respect to the source of current, the two series A and B of switches being interconnected by one common extremity to said current source (J), and by the other common extremity to said voltage source (E), the rank k associated with the cells increasing from the cell ($CL_1$) in which the switches are directly connected to the current source (k=1) to the cell ($CL_n$) in which the switches are directly connected to the voltage source (k=n), said conversion device being characterized in that:

capacitors ($c_k$) associated with the switching cells ($CL_k$) in such a manner that the symmetrical terminals of the two switches ($I_{Ak}$, $I_{Bk}$) of each cell are connected to each other through a capacitor for maintaining between said terminals a voltage, termed a load voltage of the capacitor, and assuring an alternate circulation of current from one switch to another switch of the cell, the control logics ($LG_k$) of the -n- switching cells are synchronized for distributing the control signals ($sc_k$) over time such that the current circulating in each capacitor ($c_k$) has, over a period of time 1/F, an average value essentially proportional to the variation of the voltage at the terminals of the voltage source over that same period of time, and in particular essentially zero for a continuous voltage source.

2. A device as in claim 1, characterized in that each capacitor ($c_k$) associated with a switching cell ($CL_k$) has a range of voltage greater than a threshold $V_{ck}$ as a function of increasing rank k of the cell with which is associated said capacitor, with $V_{ck}$=k.Vm/n where Vm is the maximum voltage of the voltage source (E).

3. A device as in claim 1, characterized in that each capacitor ($c_k$) associated with the switching cell ($CL_k$) of rank k is sized so as to present a capacity $c_k$ sufficient that variations of voltage at the terminals of said capacitor will be less than 0.2 V/n, where V is the voltage of the voltage source (E).

4. A device as in claim 1, wherein the switches ($I_{Ak}$, $I_{Bk}$) of the switching cells ($CL_k$) are static semiconductor switches, having a reversibility of voltage identical to that of the voltage source (E) and a reversibility of current identical to that of the current source (J).

5. A device as in claim 1, characterized in that the control logics ($LG_k$) are connected to synchronization (SYNCHRO) comprising an oscillator (OSC) of a frequency F, a succession of delay circuits ($RET_k$) delivering a system of signals ($sd_k$) shifted for two successive signals by a time difference equal to 1/nF, correctors ($CO_k$) delivering correction signals ($sg_k$) proportional to the rank k of the corrector, at the frequency F, at the variation of voltage $V_0-V_1$ over the period 1/F, and at the capacity of the capacitor of the same rank k, and inversely proportional to the average value $$\frac{I_0 + I_1}{2}$$

of current over said period, and totalizers ($SM_k$) for delivering synchronization signals ($sy_k$) from said shifted signals ($sd_k$) and said correction signals ($sg_k$), each control logic comprising a comparator receiving the reference signal (sr) issues by the control means (GP) and the synchronization signal ($sy_k$) of corresponding rank k issued by the synchronization means (SYNCHRO).

6. A device as in claim 1, connected to a continuous voltage source and a continuous current source, for providing a continuous/continuous converter, in which each switching cell ($CL_k$) comprises an switch ($I_{Ak}$) of the type controllable upon starting and upon blocking, and a double spontaneous switching switch ($I_{Bk}$).

7. A device as in claim 6, characterized in that the control logics ($LG_k$) of -n- switching cells are synchronized in such a manner that the control signals ($sc_k$, $sc_{k+1}$) delivered to the two cells ($CL_k$, $CL_{k+1}$) of successive ranks k and k+1 imposed on these cells logic states $e_k$ and $e_{k+1}$ such that, if $e_k \neq e_{k+1}$, the cumulative periods during which $e_k$ ET $e_{k+1}=1$ are essentially equal to the cumulative periods during which $e_k$ ET $e_{k+1}=1$, the logic state $e_k$ of one cell ($CL_k$) being defined as equal to 1 when the switch ($I_{Ak}$) of the cell forming a part of the series A is conducting (the other switch ($I_{Bk}$) of the cell, of the B series, being blocking), and is equal to 0 when the switch ($I_{Ak}$) of the A series is blocking (the other switch ($I_{Bk}$) of the cell of the B series being conducting).

8. A device as in claim 7, characterized in that the control logics ($LG_k$) of -n- switching cells are connected to synchronization means (SYNCHRO) comprising means for generating triangular phase shifted signals (OSCT, $RET_2$, $RET_1$) able to deliver control signals ($sd_3$, $sd_2$, $sd_1$) of the same frequency -F- phase shifted by $2\pi/n$ for one signal relative to the following signal.

9. A device as in claim 1, connected to a continuous voltage source and a source of symmetrical alternating current for providing a continuous/alternating and/or alternating/continuous converter in which each switching cell ($CL_k$) comprises two identical switches ($I_{Ak}$, $I_{Bk}$) reversible as to current and unidirectional as to voltage.

10. A device as in claim 9 connected to a constant voltage source and a source of symmetrical alternating current of a frequency fi, characterized in that the control logics ($CL_k$) of the -n- switching cells are synchronized in such a manner that the control signals ($sc_k$, $sc_{k+1}$) delivered to the two cells ($CL_k$, $CL_{k+1}$) of successive ranks k and k+1 impose on these cells logic states $e_k$ and $e_{k+1}$ such that:

the logical value $e_k$ ET $e_{k+1}$ is periodic, of a frequency 2fi, twice the frequency of the source of current, the logical value $e_k$ ET $e_{k+1}$ is also periodic, with the same frequency 2 fi, the logic state $e_k$ of one cell being defined as equal to 1 when the switch ($I_{Ak}$) of the cell forming a part of the A series is conducting (the other switch $I_{Bk}$) of that cell, of the B series, being blocking), and equal to 0 when the switch of said A series is blocking (the other switch of that cell, of the B series, being conducting).

11. A device as in claim 10, characterized in that the control means (GP) is adapted to deliver a symmetrically alternating reference signal (sr) of a frequency fi, and the control logics ($LG_k$) of the -n- switching cells are connected to synchronization means (SYNCHRO) comprising means for generating triangular signals (OSCT, $RET_2$, $RET_1$) adapted to deliver n symmetrical alternating triangular signals ($sd_k$), said signals having the same amplitude and the same frequency -F- as a multiple of the frequency fi and being shifted in time such that the states ($sd_{k+1}$) of the rank k+1 is delayed in time by a value of 1/nF with respect to the signal ($sd_k$) of rank k, the n logics ($LG_k$) each comprising a comparator receiving the reference signal (sr) issued by the control means (GP) and a triangular signal ($sd_k$) issued by the generation means, the comparator of rank k being connected to the switching cell ($CL_k$) of rank k for controlling the same as a function of the relative values of the two signals (sr, $sd_k$) which it receives.

12. A device as in claim 9 connected to a constant voltage source and a source of symmetrical alternating current of a frequency fi, comprising two switching cells ($LG_1$, $LG_2$; n=2), characterized in that the control logics ($LG_1$m $LG_2$) of the two switching cells are adapted such that the control signals ($sc_1$, $sc_2$) have a frequency P equal to the frequency fi of the current source, said logics being synchronized in such a manner that these control signals impose on the cells ($CL_1$, $CL_2$) logic states $e_1$ and $e_2$ such that $e_2$ is obtained in complement to $e_1$ and while shifting it one-half of a period 1/2F.

13. A device as in claim 1, connected to a source of symmetrical alternating voltage having a frequency fv and a source of direct current for providing alternating/continuous and/or a continuous/alternating converter in which each switching cell ($CL_k$) comprises two identical switches ($I_{Ak}$, $I_{Bk}$) reversible as to voltage and unidirectional as to current.

14. A device as in claim 13, connected to a source of symmetrical alternating voltage having a frequency fv and a source of direct current, characterized in that the control logics ($LG_k$) of the -n- switching cells are synchronized in such a manner that the control signals delivered to the two cells ($CL_k$, $CL_{K+1}$) of successive ranks k and k+1 impose on these cells logic states $e_k$ and $e_{k+1}$ such that over each period 1/F, the difference between the duration of the state $e_k$ ET $e_{k+1}=1$ and the duration of the state $e_k$ ET $e_{k+1}=1$ are essentially equal to $$\frac{c_k}{I} \times \frac{k}{n} |V_0 - V_1|$$

where $C_k$ is the capacitance of the capacitor of rang k,

I is the value of the current from the current source, $V_0$ is the voltage at the terminals of the voltage source at the start of the period 1/F considered, and $V_1$ is this voltage at the end of said period, the logic state $e_k$ of a cell ($CL_k$) being defined as equal to 1 when the switch ($I_{Ak}$) of the cell forming a part of the A series is conducting (the other switch ($I_{Bk}$) of the cell, of the B series being blocking), and equal to 0 when the switch of said A series is blocking (the other switch of the cell, of the B series, being conducting).

15. A device as in claim 14, characterized in that the control means (GP) is adapted to deliver a symmetrical alternating reference signal (sr) of a frequency fv, and in that the control logics ($LG_k$) of the -n- switching cells are connected to synchronization means (SYNCHRO) comprising:

means for generating triangular signals (OSCT, $RET_2$, $RET_1$) adapted to deliver n symmetrical alternating triangular signals ($sd_k$), said signals having the same amplitude and the same frequency -F- as a multiple of the frequency fv and being shifted in time such that the signal ($Sd_{k+1}$) of rank k+1 is delayed in time by a value of 1/nP with respect to the signal ($sd_k$) of rank k.

correction means ($COR_k$) for receiving the reference signals (sr) issued by the control means (GP) and adapted to deliver corrected reference signals ($sg_k$) of relative amplitude $g_k$ with respect to that of the triangular signals ($sd_k$), such that $$|g_k - g_{k+1}| = \frac{2c_k}{I} \times \frac{k}{n} |V_0 - V_1| \times F$$

the n logics ($LG_k$) each comprising a comparator receiving a triangular signal ($sd_k$) and a corrected reference signal ($sg_k$), the comparator of rank k being connected to the switching cell ($CL_k$) of rank k for controlling the same as a function of the relative values of the two signals ($sd_k$, $sg_k$) which it receives.

16. A device as in claim 1, connected to a source of symmetrical alternating voltage and to a source of symmetrical alternating current for providing an alternating/alternating converter, in which each switching cell ($CL_k$) comprises two identical switches ($I_{Ak}$, $I_{Bk}$) reversible as to current and voltage.

17. A device as in claim 16, connected to a symmetrical alternating voltage source having a frequency fv and a symmetrical alternating current source having a frequency fi, characterized in that the control logics ($LG_n$) of the -n- switching cells are synchronized in such a manner that the control signals ($sc_k$, $sc_{k+1}$) of successive ranks $s_k$ and $s_{k+1}$ impose on these cells logic states $e_k$ and $e_{k+1}$ such that, for each period 1/F, the difference between the duration of the state $e_k + e_{k+1} = 1$ and the duration of the state $e_k + e_{k+1} = 1$ is essentially equal to $$2c_k \cdot \frac{k}{n} \cdot \frac{V_0 - V_1}{I_0 + I_1}$$

where $c_k$ is the capacitance of the capacitor of rank k, $I_0$ and $V_0$ are the values of the sources of current and of voltage at the start of the period 1/F considered, and $I_1$ and $V_1$ are these values at the end of said period, the logic state $e_k$ of one cell being defined as equal to 1 when the switch ($I_{Ak}$) of the cell forming a part of the A series is conducting (the other switch ($I_{Bk}$) of the cell, of the B series, being blocking), and equal to 0 when the switch of the A series is blocking (the other switch of the cell, of the B series, being conducting).

18. A device as in claim 17, characterized in that the control logics ($LG_k$) of the -n- switching cells are connected to synchronizing means (SYNCHRO) comprising:

means for generating triangular signals (OSCT, $RET_2$, $RET_1$) adapted to deliver n symmetrical alternating triangular signals ($SD_k$), said signals having the same amplitude and the same frequency -F- greater than the frequencies fi and fv and being shifted in time such that the signal ($sd_{k+1}$) of rank k+1 is delayed in time by a value of 1/nF with respect to the signal ($sd_k$) of rank k.

correction means ($COR_k$) receiving the reference signal (sr) issued by the control means (GP) and adapted to deliver corrected reference signals ($sg_k$) of a relative amplitude $g_k$ with respect to that of the triangular signals ($sd_k$), such that $$|g_k - g_{k+1}| = \frac{4c_k}{I_0 + I_1} \cdot \frac{k}{n} |v_0 - v_1| \cdot F$$

the n logics ($LG_k$) each comprising a comparator receiving a triangular signal ($sd_k$) and a corrected reference signal ($sg_k$), the comparator of rank k being connected to the switching cell ($CL_k$) of rank k for controlling the same as a function of the relative values of the two signals ($sd_k$, $sg_k$) which it receives.

19. A device as in claim 1, comprising two switching cells.

20. A device as in claim 1, comprising three switching cells.

* * * * *

UNITED STATES PATENT AND TRADEMARK OFFICE
CERTIFICATE OF CORRECTION

PATENT NO : 5,737,201
DATED : April 7, 1998
INVENTOR(S): Thierry Meynard and Henri Foch It is certified that error appears in the above-identified patent and that said Letters Patent is hereby corrected as shown below:

On the title page,
[73] Assignee: CENTRE NATIONAL DE LA RECHERCHE SCIENTIFIQUE (C.N.R.S.) PARIS, FRANCE Signed and Sealed this Twenty-ninth Day of June, 1999

*Attest:*

Q. TODD DICKINSON

*Attesting Officer*        Acting Commissioner of Patents and Trademarks